United States Patent
Fujiike et al.

(10) Patent No.: US 7,014,521 B1
(45) Date of Patent: Mar. 21, 2006

(54) DISPLAY PANEL HAVING A COLOR FILTER AND A PROTECTIVE LAYER OF HEAT MELTED MATERIAL AND METHOD OF MANUFACTURING THE DISPLAY PANEL

(75) Inventors: Hiroshi Fujiike, Yokohama (JP); Hiroshi Sato, Yokohama (JP); Akio Kashiwazaki, Yokohama (JP); Kenichi Iwata, Tokyo (JP); Akio Nishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 311 days.

(21) Appl. No.: 09/631,951

(22) Filed: Aug. 3, 2000

(30) Foreign Application Priority Data

Aug. 5, 1999 (JP) .................................. 11-222641
Jul. 10, 2000 (JP) .............................. 2000-208735

(51) Int. Cl.
*H01J 9/00* (2006.01)
(52) U.S. Cl. ...................................................... 445/24
(58) Field of Classification Search ................. 445/24; 427/165, 168; 347/19
See application file for complete search history.

(56) References Cited

U.S. PATENT DOCUMENTS

| | | | | |
|---|---|---|---|---|
| 3,682,960 | A | * 8/1972 | Haller | 524/233 |
| 4,313,124 | A | 1/1982 | Hara | 346/140 R |
| 4,345,262 | A | 8/1982 | Shirato et al. | 346/140 R |
| 4,459,600 | A | 7/1984 | Sato et al. | 346/140 R |
| 4,463,359 | A | 7/1984 | Ayata et al. | 346/1.1 |
| 4,558,333 | A | 12/1985 | Sugitani et al. | 346/140 R |
| 4,723,129 | A | 2/1988 | Endo et al. | 346/1.1 |
| 4,740,796 | A | 4/1988 | Endo et al. | 346/1.1 |
| 5,576,070 | A | 11/1996 | Yaniv | 427/510 |
| 5,689,318 | A | 11/1997 | Matsuyama et al. | 349/106 |
| 5,710,234 | A | 1/1998 | Fujishiro et al. | 528/106 |
| 6,078,378 | A | * 6/2000 | Lu et al. | 349/155 |

FOREIGN PATENT DOCUMENTS

| | | |
|---|---|---|
| EP | 0 646 845 | 4/1995 |
| EP | 0 735 401 | 10/1996 |
| EP | 756933 A2 * | 2/1997 |
| EP | 0 832 745 | 4/1998 |

(Continued)

OTHER PUBLICATIONS

T. Hasegawa, et al., "Progress In Development of Color Filters by Pigment Ink Jet Printing", FMC3-4, pp. 299-302 (IDW 1998).

*Primary Examiner*—Joseph Williams
(74) *Attorney, Agent, or Firm*—Fitzpatrick, Cella, Harper & Scinto

(57) ABSTRACT

A display apparatus includes a color filter with a color portion formed in at least one recess portion surrounded by partition walls on a substrate and a protective layer formed on the color portion and the partition walls. A thickness of the color portion is 20% to 80% of a thickness of the partition walls, and a thickness of a first protective layer formed on the partition walls is smaller than a thickness of a second protective layer formed on the color portion. In addition, a counter substrate faces the color filter, a liquid crystal layer exists between the color filter and the counter substrate, and a spacer is arranged on the first protective layer formed on the partition walls.

23 Claims, 21 Drawing Sheets

FOREIGN PATENT DOCUMENTS

| | | |
|---|---|---|
| EP | 0 832 752 | 4/1998 |
| EP | 0 905 544 | 3/1999 |
| JP | 54-56847 | 5/1979 |
| JP | 59-75205 | 4/1984 |
| JP | 59-123670 | 7/1984 |
| JP | 59-138461 | 8/1984 |
| JP | 60-71260 | 4/1985 |
| JP | 9-90342 | 4/1997 |
| JP | 10-39291 | 2/1998 |
| JP | 11-23833 | 1/1999 |
| JP | 11-202124 | 7/1999 |
| JP | 2000-9918 | 1/2000 |
| JP | 2000-35511 | 2/2000 |
| JP | 2000-75121 | 3/2000 |
| JP | 2000-89022 | 3/2000 |

* cited by examiner

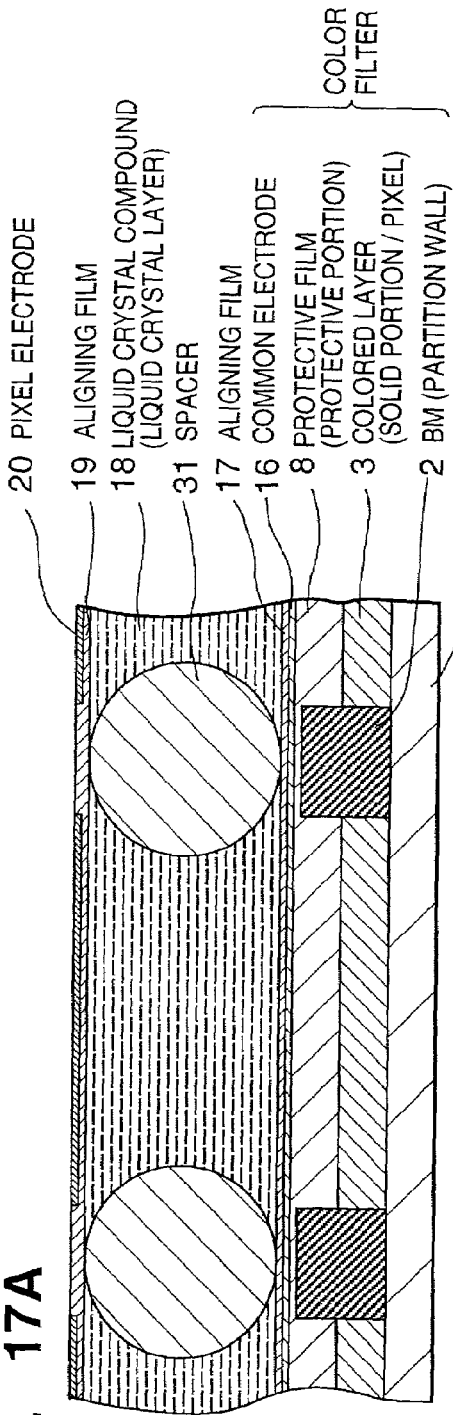
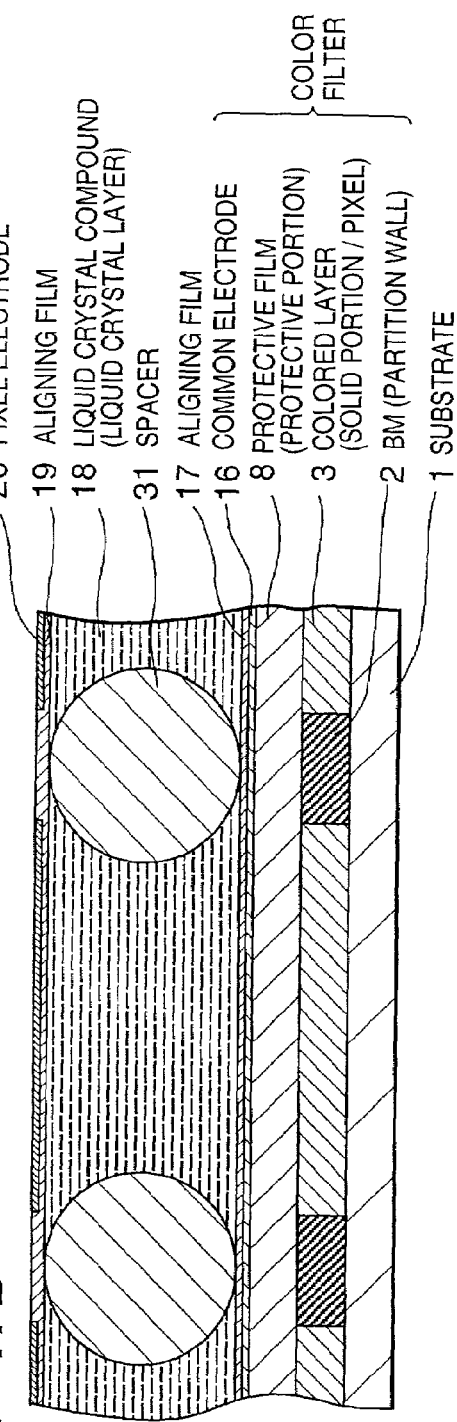
FIG. 17A
FIG. 17B

FIG. 19A
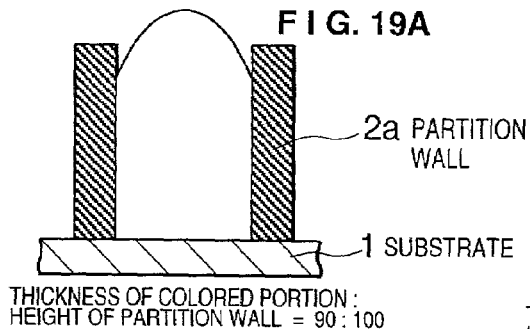
THICKNESS OF COLORED PORTION :
HEIGHT OF PARTITION WALL = 90 : 100

FIG. 19B
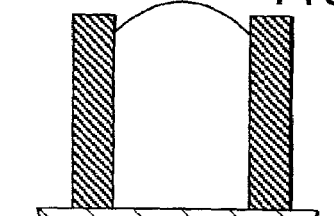
THICKNESS OF COLORED PORTION :
HEIGHT OF PARTITION WALL = 80 : 100

FIG. 19C
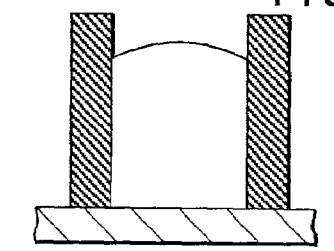
THICKNESS OF COLORED PORTION :
HEIGHT OF PARTITION WALL = 70 : 100

FIG. 19D
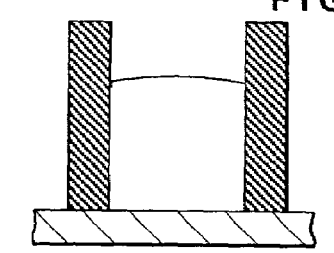
THICKNESS OF COLORED PORTION :
HEIGHT OF PARTITION WALL = 60 : 100

FIG. 19E
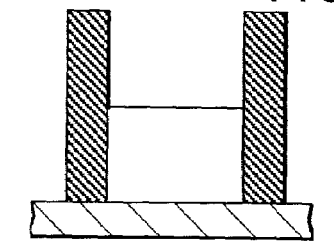
THICKNESS OF COLORED PORTION :
HEIGHT OF PARTITION WALL = 50 : 100

FIG. 19F
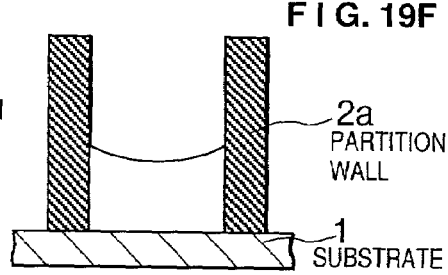
THICKNESS OF COLORED PORTION :
HEIGHT OF PARTITION WALL = 40 : 100

FIG. 19G
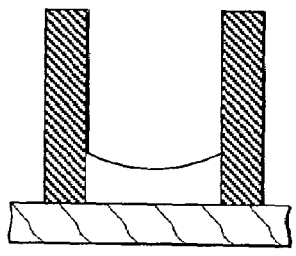
THICKNESS OF COLORED PORTION :
HEIGHT OF PARTITION WALL = 30 : 100

FIG. 19H
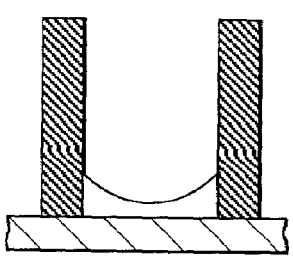
THICKNESS OF COLORED PORTION :
HEIGHT OF PARTITION WALL = 20 : 100

FIG. 19I
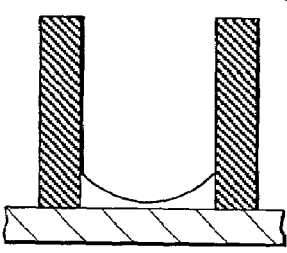
THICKNESS OF COLORED PORTION :
HEIGHT OF PARTITION WALL = 10 : 100

DISPLAY PANEL HAVING A COLOR FILTER AND A PROTECTIVE LAYER OF HEAT MELTED MATERIAL AND METHOD OF MANUFACTURING THE DISPLAY PANEL

FIELD OF THE INVENTION

The present invention relates to a technique of manufacturing a display device panel (display element) such as a color filter.

BACKGROUND OF THE INVENTION

In general, liquid crystal display devices are mounted in personal computers, wordprocessors, pinball machines, car navigation systems, compact TV sets, and the like. There have recently been great demands for liquid crystal display devices. However, liquid crystal display devices are expensive, and hence the demand for a reduction in cost has become increasingly higher.

A color filter as a component of a liquid crystal display device is formed by arranging pixels such as red (R), green (G), and blue (B) pixels on a transparent substrate. A black matrix for blocking light is arranged around each pixel to improve the display contrast.

As conventional color filter manufacturing methods, pigment dispersion, dyeing, electrodeposition, and printing are known.

In the pigment dispersion method, a pigment-dispersed photosensitive resin layer is formed on a substrate and patterned into a single-color pattern. This process is repeated three times for R, G, and B to form color filters.

In the dyeing method, a water-soluble polymer material as a dyeable material is formed on a glass substrate and patterned into a given shape by a photolithography process. The obtained pattern is dipped in a dye bath to obtain a colored pattern. This process is repeated three times for R, G, and B to form color filter layers.

In the electrodeposition method, a transparent electrode is patterned on a substrate, and the resultant structure is dipped in an electrodeposition coating fluid containing a pigment, resin, electrolyte, and the like to be colored in a single color by electrodeposition. This process is repeated three times for R, G, and B to form color filter layers. Finally, these layers are calcined.

In the print method, printing is performed three times by using materials obtained by dispersing pigments in a thermosetting resin to form R, G, and B coatings. Thereafter, the resin is cured.

These four methods have a common feature that the same process must be repeated three times to color layers in three colors, i.e., R, G, and B. Since a large number of processes are required, the yield decreases, resulting in an increase in cost and the like.

In the electrodeposition method, limitations are imposed on pattern shapes which can be formed. For this reason, this method cannot be applied to TFTs. In the print method, a pattern with a fine pitch cannot be formed because of poor resolution.

In order to eliminate these drawbacks, techniques of forming color filter patterns by discharging ink onto a glass substrate using ink-jet heads have been proposed.

In such an ink-jet method disclosed in, e.g., Japanese Patent Laid-Open No. 59-75205, inks containing coloring agents of three colors, i.e., R, G, and B, are discharged on a substrate by an ink-jet system, and the respective inks are dried to form colored image portions. In this ink-jet method, R, G, and B pixels can be formed at once, greatly simplifying the manufacturing process and greatly reducing the cost.

The first problem to be solved by the present invention will be described first. In these color filters, protective layers are often formed on colored (color) layers to smooth (flatten) the surfaces or protect the colored layers (colored portions). In this case, in order to sufficiently protect a colored layer, the thickness of a protective layer on the colored layer is required to be a predetermined value or more. In contrast to this, in consideration of the amount of material used, the protective layer is required to be thin. In a liquid crystal display device, in particular, a member called a spacer is often used to keep the thickness of the liquid crystal layer, sandwiched between the color filter and the counter substrate, constant. Assume that the protective layer is thick enough to sufficiently protect the colored layer. In this case, when a liquid crystal is injected into the space between the color filter and the counter substrate under a reduced pressure or the surface of the liquid crystal display device is pressed, the spacer sinks into the protective layer. This makes it impossible to keep the thickness of the liquid crystal layer constant. As described above, the first problem to be solved by the present invention is the problem of how to satisfy the contradictory requirements for the thickness of the protective layer.

The second problem to be solved by the present invention will be described next. Consider a method of manufacturing optical elements (display device panel including color filters, EL elements, and the like), in which recess portions surrounded by partition walls on a substrate are filled with ink containing a coloring agent, an evaporative liquid component, a holding component that holds the coloring agent upon evaporation of the liquid component, and the like by using an ink-jet system or the like, and the liquid component in the charged ink is then evaporated, thereby forming solid portions (colored portions) including the coloring agent and holding component left in the recess portions. In this method, as shown in FIGS. 13A and 13C which are sectional views of the substrate, the surfaces of the solid portions become uneven. Unless the shapes of the surfaces of solid portions are controlled, light may be undesirably refracted at the surfaces of the solid portions, or the attenuation amount of light in the solid portions may deviate from a predetermined amount depending on the position. Assume that a color filter used in a liquid crystal display device or the like is in the state shown in FIG. 13A. In this case, even if the coloring agent is uniformly held in the solid portions, the transmittance of rays of light transmitted through each recess portion varies locally depending on the distances from the bottom surface to the top surface of the solid portion. For this reason, if a color filter having uneven solid portion surfaces, like the one shown in FIG. 13A, is used, rays of light transmitted through the color filter are partly vignetted when the user obliquely sees the liquid crystal display device. As a consequence, for example, the user notices variations in color density.

FIGS. 13A and 13C show how the shapes of the surfaces of solid portions change, but do not indicate that these elements (display device panel) are always unsuitable as optical elements. Actually, for application to pinball machines, car navigation systems, compact TV sets, color filters and the like having planarities similar to those shown in FIGS. 13A and 13C suffice in many cases.

In T. Hasegawa, Y Ikuta, Y. Nonaka and N. Ishimaru, "Progress in Development of Color filters by Pigment Ink Jet Printing", FMC3-4, p. 299–302, IDW'98 Proceedings of the Fifth International Display Workshops, the second illustration in FIG. 5 shows a state wherein the surface of a solid portion formed in a recess portion formed by partition walls on a substrate is almost planarized, with the distance from the bottom surface to the top surface of the solid portion being about 60% of the distance from the bottom portion to the top portion of each partition wall. However, this reference does not indicate that even if the distance from the bottom portion to the top portion of each partition wall differs from that shown in FIG. 5, the surface of each solid portion is almost planarized as long as the ratio of the mean distance from the bottom surface to the top surface of the solid portion formed in each recess portion formed by the partition walls on the substrate to the distance from the bottom portion to the top portion of each partition wall remains unchanged. This technique differs from the present invention in this point.

Japanese Patent Laid-Open No. 9-90342 discloses a technique of forming a color filter at a level lower than that of a light-shielding film and refers to the density of color in a colored area in association with a problem to be solved. However, this problem is ascribed to an insufficient amount of coloring agent supplied to an ink-receiving layer, and irrelevant to the technical problem to be solved by the present invention, i.e., the problem of planarization of the surfaces of solid portions. The prior art described above differs from the present invention in this point.

As described above, the second problem to be solved by the present invention is the problem of how to ensure good planarities of the surface of each solid portion (the surface of each colored portion) described above.

SUMMARY OF THE INVENTION

The present invention has been made in consideration of the above problems, and has as its object to provide to a color filter which can sufficiently protect colored portions, reduce the amount of protective material used, and keep the thickness of a liquid crystal layer constant, a method and apparatus for manufacturing the color filter.

It is another object of the present invention to provide a color filter which can sufficiently protect colored portions, reduce the amount of protective material used, keep the thickness of a liquid crystal layer constant, and make each colored portion surface have good planarities, a method and apparatus for manufacturing the color filter.

It is still another object of the present invention to provide a color filter with colored portions having surfaces with good planarities, and a method and apparatus for manufacturing the color filter.

It is still another object of the present invention to provide a method and apparatus for manufacturing a display device panel with colored portions having surfaces with good planarities.

It is still another object of the present invention to provide a method of planarizing the surface of each colored portion of a color filter.

It is still another object of the present invention to provide a method of determining the amount of ink to be used to manufacture a color filter with good planarities.

It is still another object of the present invention to provide a method of manufacturing a display device using a color filter with good planarities, and a method of manufacturing an apparatus having the display device.

In order to solve the above problems and achieve the above objects, according to the present invention, there is provided a method of manufacturing a color filter having colored portions by filling at least one recess portion surrounded by partition walls on a substrate with ink, comprising the step of, a step of preparing information about a third amount of ink which is obtained by executing at least a first step of measuring at least a mean distance from a bottom surface to a top surface of a colored portion formed by filling a first recess portion with a first amount of ink and a mean distance from a bottom surface to a top surface of a colored portion formed by filling a second recess portion with a second amount of ink, a second step of creating data representing a relationship between a mean distance from a bottom surface to a top surface of a colored portion and an ink amount from at least the two measured mean distances and at least the two corresponding ink amounts, and a third step of determining the third amount of ink to be charged into one recess portion on the basis of the data such that the mean distance from the bottom surface to the top surface of the colored portion falls within a predetermined range, and a formation step of forming a colored portion in the recess portion by filling the recess portion with the third amount of ink, wherein the distance within the predetermined range is 20% to 80% of a distance from a bottom portion to a top portion of the partition wall.

According to the present invention, there is provided a method of manufacturing a color filter having colored portions formed by filling at least one recess portion surrounded by partition walls on a substrate with ink, comprising the step of, a step of preparing information about a second amount of ink which is obtained by executing at least a first step of measuring a mean distance from a bottom surface to a top surface of a colored portion formed by filling a first recess portion with a first amount of ink, a second step of creating data representing a relationship between a mean distance from a bottom surface to a top surface of a colored portion and an ink amount from the measured mean distance and the corresponding first ink amount, and a third step of determining the second amount of ink to be charged into one recess portion on the basis of the data such that the mean distance from the bottom surface to the top surface of the colored portion falls within a predetermined range, and a formation step of forming a colored portion in the recess portion by filling the recess portion with the second amount of ink, wherein the distance within the predetermined range is 20% to 80% of a distance from a bottom portion to a top portion of the partition wall.

According to the present invention, there is provided an apparatus for manufacturing a color filter having colored portions by filling at least one recess portion surrounded by partition walls on a substrate with ink, comprising a data storage unit for storing information about a third amount of ink which is obtained by using at least measurement means for measuring at least a mean distance from a bottom surface to a top surface of a colored portion formed by filling a first recess portion with a first amount of ink and a mean distance from a bottom surface to a top surface of a colored portion formed by filling a second recess portion with a second amount of ink, creation means for creating data representing a relationship between a mean distance from a bottom surface to a top surface of a colored portion and an ink amount from at least the two measured mean distances and at least the two corresponding ink amounts, and determination means for determining the third amount of ink to be charged into one recess portion on the basis of the data such that the mean distance from the bottom surface to the top surface of the colored portion falls within a predetermined range, and formation means for forming a colored portion in the recess portion by filling the recess portion with the third amount of ink on the basis of the information about the third amount of ink which is read out from the data storage unit, wherein the distance within the predetermined range is 20% to 80% of a distance from a bottom portion to a top portion of the partition wall.

According to the present invention, there is provided an apparatus for manufacturing a color filter having colored portions by filling at least one recess portion surrounded by partition walls on a substrate with ink, comprising measurement means for measuring at least a mean distance from a bottom surface to a top surface of a colored portion formed by filling a first recess portion with a first amount of ink and a mean distance from a bottom surface to a top surface of a colored portion formed by filling a second recess portion with a second amount of ink, creation means for creating data representing a relationship between a mean distance from a bottom surface to a top surface of a colored portion and an ink amount from at least the two measured mean distances and at least the two corresponding ink amounts, determination means for determining the third amount of ink to be charged into one recess portion on the basis of the data such that the mean distance from the bottom surface to the top surface of the colored portion falls within a predetermined range, and formation means for forming a colored portion in the recess portion by filling the recess portion with the third amount of ink which is determined by the determination means, wherein the distance within the predetermined range is 20% to 80% of a distance from a bottom portion to a top portion of the partition wall.

According to the present invention, there is provided an apparatus for manufacturing a color filter having colored portions by filling at least one recess portion surrounded by partition walls on a substrate with ink, comprising a data storage unit for storing information about a third amount of ink which is obtained by executing at least a step of measuring at least a mean distance from a bottom surface to a top surface of a colored portion formed by filling a first recess portion with a first amount of ink and a mean distance from a bottom surface to a top surface of a colored portion formed by filling a second recess portion with a second amount of ink, a step of creating data representing a relationship between a mean distance from a bottom surface to a top surface of a colored portion and an ink amount from at least the two measured mean distances and at least the two corresponding ink amounts, and a step of determining the third amount of ink to be charged into one recess portion on the basis of the data such that the mean distance from the bottom surface to the top surface of the colored portion falls within a predetermined range, and formation means for forming a colored portion in the recess portion by filling the recess portion with the third amount of ink on the basis of the information about the third amount of ink which is read out from the data storage unit, wherein the distance within the predetermined range is 20% to 80% of a distance from a bottom portion to a top portion of the partition wall.

According to the present invention, there is provided an apparatus for manufacturing a color filter having colored portions formed by filling at least one recess portion surrounded by partition walls on a substrate with ink, comprising a data storage unit for storing information about a second amount of ink which is obtained by using at least measurement means for measuring a mean distance from a bottom surface to a top surface of a colored portion formed by filling a first recess portion with a first amount of ink, creation means for creating data representing a relationship between a mean distance from a bottom surface to a top surface of a colored portion and an ink amount from the measured mean distance and the corresponding first ink amount, and determination means for determining the second amount of ink to be charged into one recess portion on the basis of the data such that the mean distance from the bottom surface to the top surface of the colored portion falls within a predetermined range, and formation means for forming a colored portion in the recess portion by filling the recess portion with the second amount of ink on the basis of the information about the second amount of ink which is read out from the data storage unit, wherein the distance within the predetermined range is 20% to 80% of a distance from a bottom portion to a top portion of the partition wall.

According to the present invention, there is provided an apparatus for manufacturing a color filter having colored portions formed by filling at least one recess portion surrounded by partition walls on a substrate with ink, comprising measurement means for measuring a mean distance from a bottom surface to a top surface of a colored portion formed by filling a first recess portion with a first amount of ink, creation means for creating data representing a relationship between a mean distance from a bottom surface to a top surface of a colored portion and an ink amount from the measured mean distance and the corresponding first ink amount, determination means for determining the second amount of ink to be charged into one recess portion on the basis of the data such that the mean distance from the bottom surface to the top surface of the colored portion falls within a predetermined range, formation means for forming a colored portion in the recess portion by filling the recess portion with the second amount of ink which is determined by the determination means, wherein the distance within the predetermined range is 20% to 80% of a distance from a bottom portion to a top portion of the partition wall.

According to the present invention, there is provided an apparatus for manufacturing a color filter having colored portions formed by filling at least one recess portion surrounded by partition walls on a substrate with ink, comprising a data storage unit for storing information about a second amount of ink which is obtained by executing at least a first step of measuring a mean distance from a bottom surface to a top surface of a colored portion formed by filling a first recess portion with a first amount of ink, a second step of creating data representing a relationship between a mean distance from a bottom surface to a top surface of a colored portion and an ink amount from the measured mean distance and the corresponding first ink amount, and a third step of determining the second amount of ink to be charged into one recess portion on the basis of the data such that the mean distance from the bottom surface to the top surface of the colored portion falls within a predetermined range, and formation means for forming a colored portion in the recess portion by filling the recess portion with the second amount of ink on the basis of the information about the second amount of ink which is read out from the data storage unit, wherein the distance within the predetermined range is 20% to 80% of a distance from a bottom portion to a top portion of the partition wall.

According to the present invention, there is provided a method of planarizing colored portion surfaces in a color filter having colored portions by filling at least one recess portion surrounded by partition walls on a substrate with ink, comprising a step of preparing information about a third amount of ink which is obtained by executing at least a first step of measuring at least a mean distance from a bottom surface to a top surface of a colored portion formed by filling a first recess portion with a first amount of ink and a mean distance from a bottom surface to a top surface of a colored portion formed by filling a second recess portion with a second amount of ink, a second step of creating data representing a relationship between a mean distance from a bottom surface to a top surface of a colored portion and an ink amount from at least the two measured mean distances and at least the two corresponding ink amounts, and a third step of determining the third amount of ink to be charged into one recess portion on the basis of the data such that the mean distance from the bottom surface to the top surface of the colored portion falls within a predetermined range, and a formation step of forming a colored portion in the recess portion by filling the recess portion with the third amount of ink, wherein the distance within the predetermined range is 20% to 80% of a distance from a bottom portion to a top portion of the partition wall.

According to the present invention, there is provided a color filter having colored portions formed by filling at least one recess portion surrounded by partition walls on a substrate with ink, comprising a colored portion formed in the recess portion, with a mean distance from a bottom surface to a top surface of the colored portion being 20% to 80% of a distance from a bottom portion to a top portion of the partition wall, and a protective portion formed on the top surface of the colored portion and the top portion of the partition wall, wherein a distance from a bottom surface to a top surface of the protective portion formed on the top portion of the partition wall is smaller than a distance from a bottom surface to a top surface of the protective portion formed on the top surface of the colored portion, and a material for the protective portion is a heat melting type material.

According to the present invention, there is provided a color filter having colored portions formed by filling at least one recess portion surrounded by partition walls on a substrate with ink, comprising a colored portion formed in the recess portion, with a mean distance from a bottom surface to a top surface of the colored portion being 20% to 80% of a distance from a bottom portion to a top portion of the partition wall, and a protective portion charged into a gap formed between the top portion of the partition wall and the top surface of the colored portion, wherein a material for the protective portion is a heat melting type material.

According to the present invention, there is provided a method of manufacturing a display device using a color filter manufactured by forming colored portions by filling at least one recess portion surrounded by partition walls on a substrate with ink, comprising a step of manufacturing a color filter by the manufacturing method defined in any one of claims 1 to 22; and a step of integrating the manufactured color filter with light amount changing means for changing a light amount.

According to the present invention, there is provided a method of manufacturing an apparatus having a display device using a color filter manufactured by forming colored portions by filling at least one recess portion surrounded by partition walls on a substrate with ink, comprising the step of, a step of manufacturing a color filter by the manufacturing method described above, a step of manufacturing a display device by integrating the manufactured color filter with light amount changing means for changing a light amount, and providing image signal supply means for supplying an image signal to the display device.

According to the present invention, there is provided a method of manufacturing a display device panel having solid portions by filling at least one recess portion surrounded by partition walls on a substrate with a liquid material containing an evaporative first component and a second component which becomes a solid portion upon evaporation of the first component, comprising the step of, a step of preparing information about a third amount of liquid material which is obtained by executing at least a first step of measuring at least a mean distance from a bottom surface to a top surface of a solid portion formed by filling a first recess portion with a first amount of liquid material and a mean distance from a bottom surface to a top surface of a solid portion formed by filling a second recess portion with a second amount of liquid material, a second step of creating data representing a relationship between a mean distance from a bottom surface to a top surface of a solid portion and a liquid material amount from at least the two measured mean distances and at least the two corresponding liquid material amounts, and a third step of determining the third amount of liquid material to be charged into one recess portion on the basis of the data such that the mean distance from the bottom surface to the top surface of the solid portion falls within a predetermined range, and a formation step of forming a solid portion in the recess portion by filling the recess portion with the third amount of liquid material, wherein the distance within the predetermined range is 20% to 80% of a distance from a bottom portion to a top portion of the partition wall.

According to the present invention, there is provided a method of manufacturing a display device panel having solid portions by filling at least one recess portion surrounded by partition walls on a substrate with a liquid material containing an evaporative first component and a second component which becomes a solid portion upon evaporation of the first component, comprising the step of, a step of preparing information about a second amount of liquid material which is obtained by executing at least a first step of measuring a mean distance from a bottom surface to a top surface of a solid portion formed by filling a first recess portion with a first amount of liquid material, a second step of creating data representing a relationship between a mean distance from a bottom surface to a top surface of a solid portion and a liquid material amount from the measured mean distance and the corresponding first liquid material amount, and a third step of determining the second amount of liquid material to be charged into one recess portion on the basis of the data such that the mean distance from the bottom surface to the top surface of the solid portion falls within a predetermined range, and a formation step of forming a solid portion in the recess portion by filling the recess portion with the second amount of liquid material, wherein the distance within the predetermined range is 20% to 80% of a distance from a bottom portion to a top portion of the partition wall.

According to the present invention, there is provided an apparatus for manufacturing a display device panel having solid portions by filling at least one recess portion surrounded by partition walls on a substrate with a liquid material containing an evaporative first component and a second component which becomes a solid portion upon evaporation of the first component, comprising a data storage unit for storing information about a third amount of liquid material which is obtained by using at least measurement means for measuring at least a mean distance from a bottom surface to a top surface of a solid portion formed by filling a first recess portion with a first amount of liquid material and a mean distance from a bottom surface to a top surface of a solid portion formed by filling a second recess portion with a second amount of liquid material, creation means for creating data representing a relationship between a mean distance from a bottom surface to a top surface of a solid portion and a liquid material amount from at least the two measured mean distances and at least the two corresponding liquid material amounts, and determination means for determining the third amount of liquid material to be charged into one recess portion on the basis of the data such that the mean distance from the bottom surface to the top surface of the solid portion falls within a predetermined range, and formation means for forming a solid portion in the recess portion by filling the recess portion with the third amount of liquid material on the basis of the information about the third amount of liquid material which is read out from the data storage unit, wherein the distance within the predetermined range is 20% to 80% of a distance from a bottom portion to a top portion of the partition wall.

According to the present invention, there is provided an apparatus for manufacturing a display device panel having solid portions by filling at least one recess portion surrounded by partition walls on a substrate with a liquid material containing an evaporative first component and a second component which becomes a solid portion upon evaporation of the first component, comprising measurement means for measuring at least a mean distance from a bottom surface to a top surface of a solid portion formed by filling a first recess portion with a first amount of liquid material and a mean distance from a bottom surface to a top surface of a solid portion formed by filling a second recess portion with a second amount of liquid material, creation means for creating data representing a relationship between a mean distance from a bottom surface to a top surface of a solid portion and a liquid material amount from at least the two measured mean distances and at least the two corresponding liquid material amounts, determination means for determining the third amount of liquid material to be charged into one recess portion on the basis of the data such that the mean distance from the bottom surface to the top surface of the solid portion falls within a predetermined range, and formation means for forming a solid portion in the recess portion by filling the recess portion with the third amount of liquid material which is determined by the determination means, wherein the distance within the predetermined range is 20% to 80% of a distance from a bottom portion to a top portion of the partition wall.

According to the present invention, there is provided an apparatus for manufacturing a display device panel having solid portions by filling at least one recess portion surrounded by partition walls on a substrate with a liquid material containing an evaporative first component and a second component which becomes a solid portion upon evaporation of the first component, comprising a data storage unit for storing information about a third amount of liquid material which is obtained by executing at least a step of measuring at least a mean distance from a bottom surface to a top surface of a solid portion formed by filling a first recess portion with a first amount of liquid material and a mean distance from a bottom surface to a top surface of a solid portion formed by filling a second recess portion with a second amount of liquid material, a step of creating data representing a relationship between a mean distance from a bottom surface to a top surface of a solid portion and a liquid material amount from at least the two measured mean distances and at least the two corresponding liquid material amounts, and a step of determining the third amount of liquid material to be charged into one recess portion on the basis of the data such that the mean distance from the bottom surface to the top surface of the solid portion falls within a predetermined range, and formation means for forming a solid portion in the recess portion by filling the recess portion with the third amount of liquid material on the basis of the information about the third amount of liquid material which is read out from the data storage unit, wherein the distance within the predetermined range is 20% to 80% of a distance from a bottom portion to a top portion of the partition wall.

According to the present invention, there is provided an apparatus for manufacturing a display device panel having solid portions by filling at least one recess portion surrounded by partition walls on a substrate with a liquid material containing an evaporative first component and a second component which becomes a solid portion upon evaporation of the first component, comprising a data storage unit for storing information about a second amount of liquid material which is obtained by using at least measurement means for measuring a mean distance from a bottom surface to a top surface of a solid portion formed by filling a first recess portion with a first amount of liquid material, creation means for creating data representing a relationship between a mean distance from a bottom surface to a top surface of a solid portion and a liquid material amount from the measured mean distance and the corresponding first liquid material amount, and determination means for determining the second amount of liquid material to be charged into one recess portion on the basis of the data such that the mean distance from the bottom surface to the top surface of the solid portion falls within a predetermined range, and formation means for forming a solid portion in the recess portion by filling the recess portion with the second amount of liquid material on the basis of the information about the second amount of liquid material which is read out from the data storage unit, wherein the distance within the predetermined range is 20% to 80% of a distance from a bottom portion to a top portion of the partition wall.

According to the present invention, there is provided an apparatus for manufacturing a display device panel having solid portions by filling at least one recess portion surrounded by partition walls on a substrate with a liquid material containing an evaporative first component and a second component which becomes a solid portion upon evaporation of the first component, comprising measurement means for measuring a mean distance from a bottom surface to a top surface of a solid portion formed by filling a first recess portion with a first amount of liquid material, creation means for creating data representing a relationship between a mean distance from a bottom surface to a top surface of a solid portion and a liquid material amount from the measured mean distance and the corresponding first liquid material amount, determination means for determining the second amount of liquid material to be charged into one recess portion on the basis of the data such that the mean distance from the bottom surface to the top surface of the solid portion falls within a predetermined range, and formation means for forming a solid portion in the recess portion by filling the recess portion with the second amount of liquid material which is determined by the determination means, wherein the distance within the predetermined range is 20% to 80% of a distance from a bottom portion to a top portion of the partition wall.

According to the present invention, there is provided an apparatus for manufacturing a display device panel having solid portions by filling at least one recess portion surrounded by partition walls on a substrate with a liquid material containing an evaporative first component and a second component which becomes a solid portion upon evaporation of the first component, comprising a data storage unit for storing information about a second amount of liquid material which is obtained by executing at least a first step of measuring a mean distance from a bottom surface to a top surface of a solid portion formed by filling a first recess portion with a first amount of liquid material, a second step of creating data representing a relationship between a mean distance from a bottom surface to a top surface of a solid portion and a liquid material amount from the measured mean distance and the corresponding first liquid material amount, and a third step of determining the second amount of liquid material to be charged into one recess portion on the basis of the data such that the mean distance from the bottom surface to the top surface of the solid portion falls within a predetermined range, and formation means for forming a solid portion in the recess portion by filling the recess portion with the second amount of liquid material on the basis of the second amount of liquid material which is read out from the data storage unit, wherein the distance within the predetermined range is 20% to 80% of a distance from a bottom portion to a top portion of the partition wall.

According to the present invention, there is provided a method of determining an amount of ink used to manufacture a color filter having colored portions by filling at least one recess portion surrounded by partition walls on a substrate with ink, comprising the step of, a measurement step of measuring at least a mean distance from a bottom surface to a top surface of a colored portion formed by filling a first recess portion with a first amount of ink and a mean distance from a bottom surface to a top surface of a colored portion formed by filling a second recess portion with a second amount of ink, a creation step of creating data representing a relationship between a mean distance from a bottom surface to a top surface of a colored portion and an ink amount from at least the two measured mean distances and at least the two corresponding ink amounts, and a determination step of determining a third amount of ink to be charged into one recess portion on the basis of the data such that the mean distance from the bottom surface to the top surface of the colored portion is 20% to 80% of the distance from the bottom portion to the top portion of the partition wall.

According to the present invention, there is provided an apparatus for determining an amount of ink used to manufacture a color filter having colored portions by filling at least one recess portion surrounded by partition walls on a substrate with ink, comprising measurement means for measuring at least a mean distance from a bottom surface to a top surface of a colored portion formed by filling a first recess portion with a first amount of ink and a mean distance from a bottom surface to a top surface of a colored portion formed by filling a second recess portion with a second amount of ink, creation means for creating data representing a relationship between a mean distance from a bottom surface to a top surface of a colored portion and an ink amount from at least the two measured mean distances and at least the two corresponding ink amounts, and determination means for determining a third amount of ink to be charged into one recess portion on the basis of the data such that the mean distance from the bottom surface to the top surface of the colored portion is 20% to 80% of the distance from the bottom portion to the top portion of the partition wall.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 17A and 17B are enlarged sectional views of liquid crystal display devices incorporating color filters;

FIGS. 19A to 19I are sectional views showing the relationship between the thickness of a colored portion with respect to the height of a partition wall and the shape of the surface of each colored portion;

DETAILED DESCRIPTION OF THE PREFERRED EMBODIMENTS

Preferred embodiments of the present invention will be described in detail in accordance with the accompanying drawings.

A display device panel (display element) defined in the present invention has display portions used for display. More specifically, the display device panel is a panel which includes, for example, a color filter having colored portions or an EL element having a luminescent portion made of a luminescent material, and is used for a display device. The colored portions of the color filter correspond to the display portions, whereas the luminescent portion of the EL element corresponds to the display portions.

A color filter defined in the present invention is comprised of colored portions and base members and capable of obtaining output light upon changing the characteristics of input light. The base members include a substrate formed by glass material or plastic material or the like, and also include the other shape than the plate like shape. More specifically, in a liquid crystal display device, backlight light is transmitted through such a color filter to obtain light of the three primary colors, i.e., R, G, and B or C, M, or Y, from the backlight light.

Note that planarization defined in the present invention means forming solid portions such that the surfaces of the solid portions are planarized, and includes not only perfectly planarizing the surfaces of the solid portions but also forming them into curved surfaces close enough to planar surfaces to satisfy an application purpose.

In addition, a planar surface defined in the present invention includes not only a perfectly planar solid portion surface but also a curved surface close enough to a planar surface to satisfy an application purpose.

First Embodiment

Figure 1:
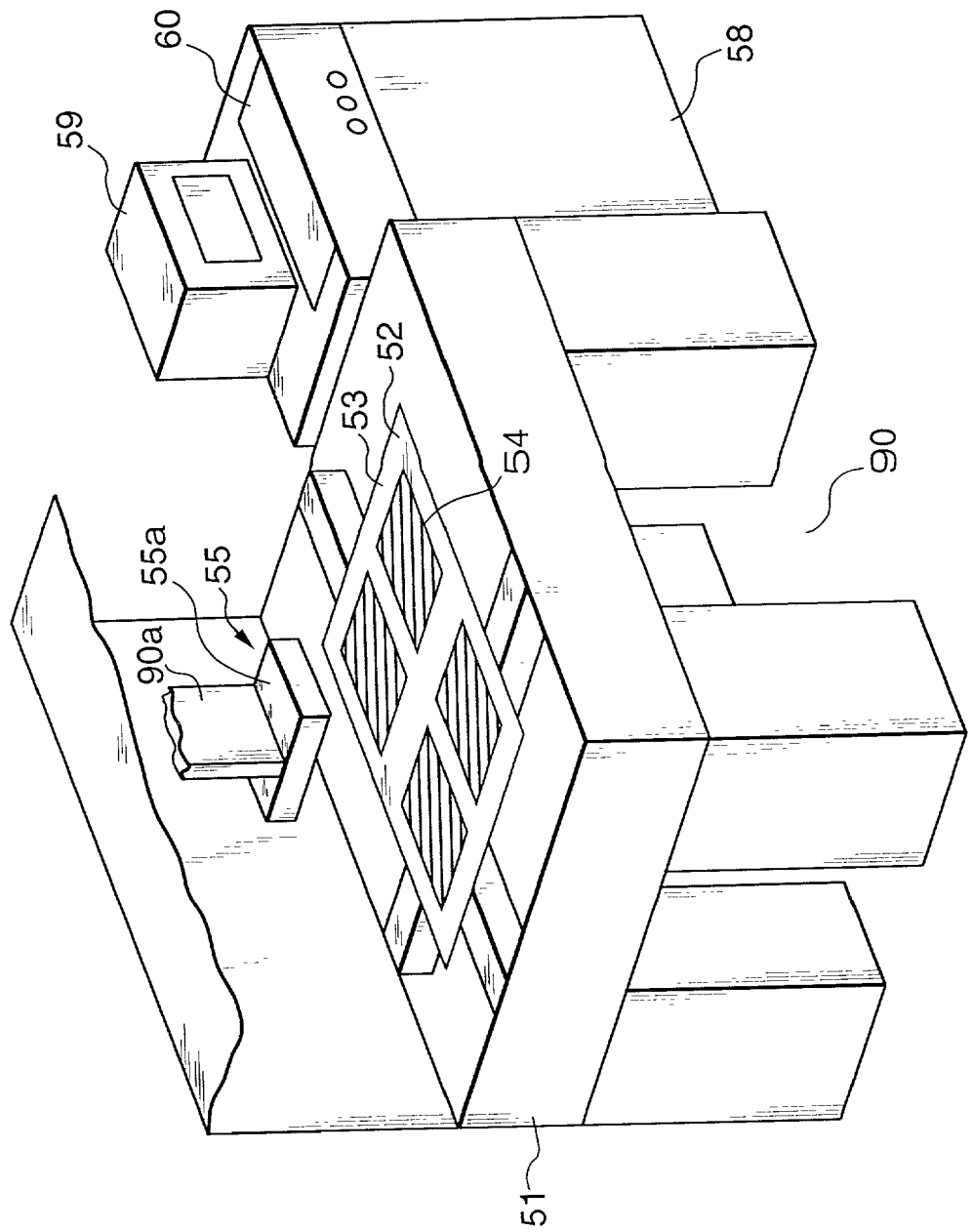
FIG. 1 is a perspective view schematically showing the structure of a color filter manufacturing apparatus according to an embodiment.

FIG. 1 is a schematic view showing the arrangement of a color filter manufacturing apparatus based on the ink-jet method during operation in a coloring process.

Referring to FIG. 1, reference numeral 51 denotes an apparatus base; 52, an X-Y-θ stage disposed on the apparatus base 51; 53, a color filter substrate set on the X-Y-θ stage 52; 54, color filters formed on the color filter substrate 53; 55, a head unit constituted by red, green, and blue ink-jet heads for coloring the color filters 54 and a head mount 55a for supporting them; 58, a controller for controlling the overall operation of a color filter manufacturing apparatus 90; 59, a display unit of the controller; and 60, a keyboard as the operation unit of the controller.

The head unit 55 is detachably mounted on a support portion 90a of the color filter manufacturing apparatus such that the pivot angle of the head unit 55 can be adjusted within a horizontal plane.

Figure 2:
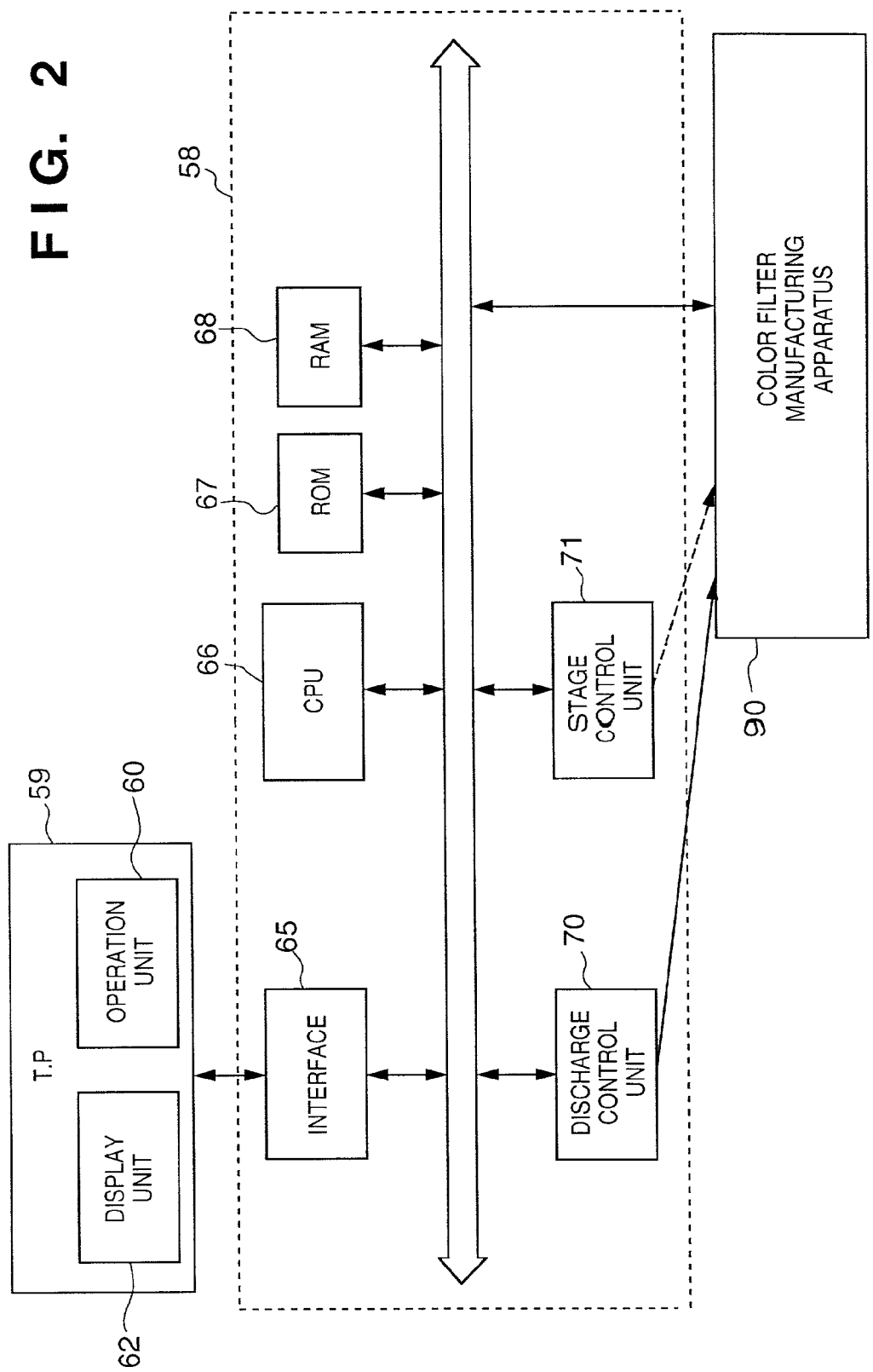
FIG. 2 is a block diagram showing the arrangement of a control unit for controlling the operation of the color filter manufacturing apparatus.

FIG. 2 is a block diagram showing the arrangement of the controller of the color filter manufacturing apparatus 90. Reference numeral 59 denotes a teaching pendant serving as the input/output means of the controller 58; and 62, a display unit for displaying how a manufacturing process progresses, information indicating the presence/absence of a head abnormality, and the like. The operation unit (keyboard) 60 provides an instruction for operation of the color filter manufacturing apparatus 90 and the like.

The controller 58 controls the overall operation of the color filter manufacturing apparatus 90. Reference numeral 65 denotes an interface for exchanging data with the teaching pendant 59; 66, a CPU for controlling the color filter manufacturing apparatus 90; 67, a ROM storing control programs for operating the CPU 66; 68, a RAM for storing abnormality information and the like; 70, a discharge control unit for controlling discharging of ink into each pixel of a color filter; and 71, a stage control unit for controlling the operation of the X-Y-θ stage 52 of the color filter manufacturing apparatus 90. The color filter manufacturing apparatus 90 is connected to the controller 58 and operates in accordance with instructions therefrom.

Figure 3:
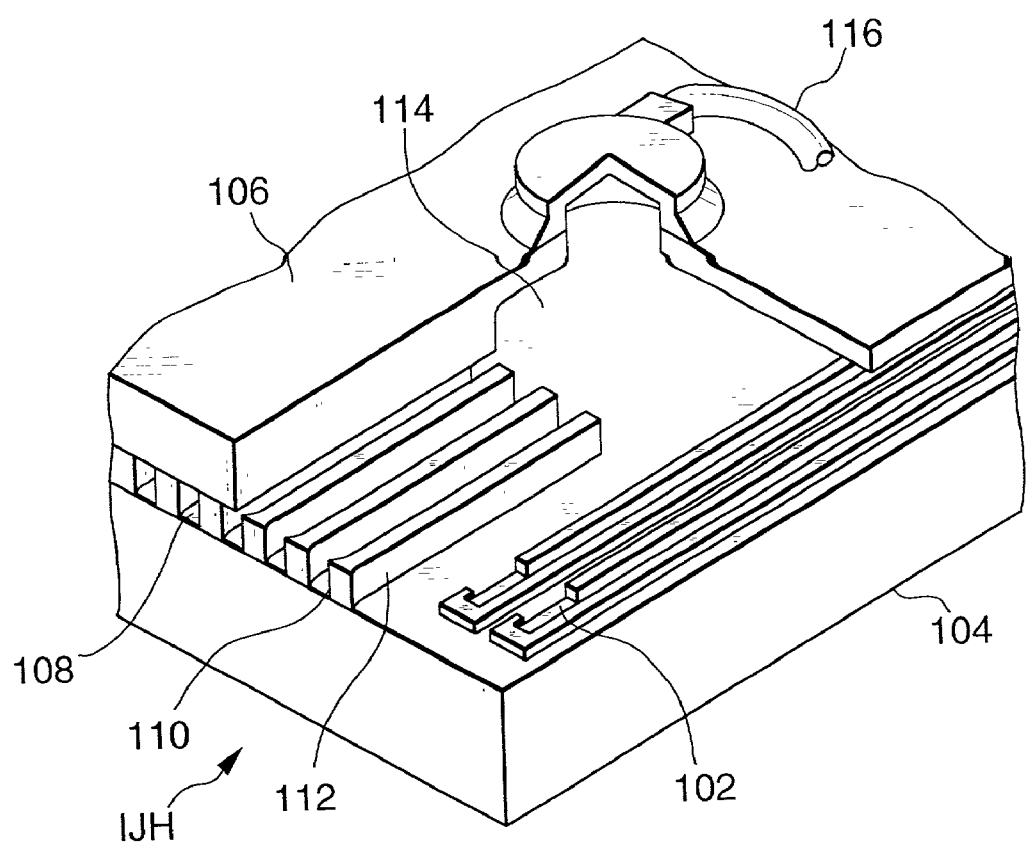
FIG. 3 is a perspective view showing the structure of an ink-jet head used in the color filter manufacturing apparatus.

FIG. 3 is a view showing the structure of an ink-jet head IJH used in the color filter manufacturing apparatus 90. In the apparatus shown in FIG. 1, three ink-jet heads are arranged in correspondence with three colors, i.e., R, G, and B. Since these three heads have the same structure, FIG. 3 shows the structure of one of the three heads as a representative.

Referring to FIG. 3, the ink-jet head IJH mainly comprises a heater board 104 as a board on which a plurality of heaters 102 for heating ink are formed, and a ceiling plate 106 mounted on the heater board 104. A plurality of orifices 108 are formed in the ceiling plate 106. Tunnel-like fluid passages 110 communicating with the orifices 108 are formed therebehind. The respective fluid passages 110 are isolated from the adjacent fluid passages via partition walls 112. The respective fluid passages 110 are commonly connected to one ink chamber 114 at the rear side of the fluid passages. Ink is supplied to the ink chamber 114 via an ink inlet 116. This ink is supplied from the ink chamber 114 to each fluid passage 110.

The heater board 104 and the ceiling plate 106 are positioned such that the position of each heater 102 coincides with that of a corresponding fluid passage 110, and are assembled into the state shown in FIG. 3. Although FIG. 3 shows only two heaters 102, the heater 102 is arranged in correspondence with each fluid passage 110. When a predetermined driving signal is supplied to the heater 102 in the assembled state shown in FIG. 3, ink above the heater 102 boils to produce a bubble, and the ink is pushed and discharged from the orifice 108 upon volume expansion of the ink. Therefore, the size of a bubble can be adjusted by controlling a driving pulse applied to the heater 102, e.g., controlling the magnitude of power. That is, the volume of the ink discharged from each orifice can be arbitrarily controlled. In manufacturing a color filter, it is preferable the volumes of ink (the amount of ink) discharged from the respective orifices be substantially matched to each other. This is because equalizing the amounts of ink discharged will reduce irregularity among pixels as compared with a case wherein the amounts of ink discharged vary.

Figure 4:
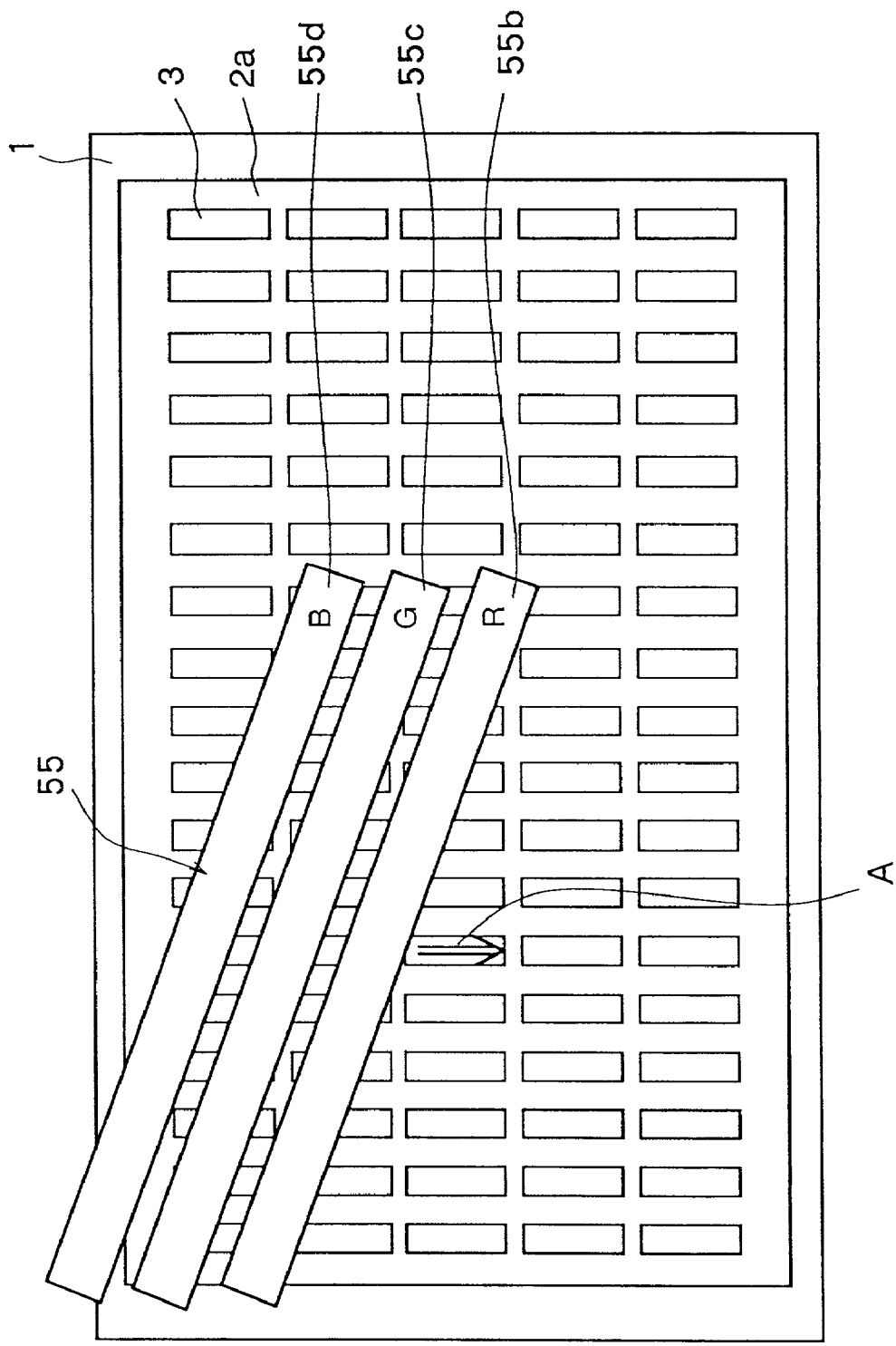
FIG. 4 is a view showing a manufacturing process for a color filter.

FIG. 4 is a view showing an example of the process of manufacturing a color filter.

A light-transmitting substrate is preferably used as a substrate 1 for a color filter of the present invention. In general, a glass substrate is used. However, a substrate other than a glass substrate can be used as long as it has characteristics, e.g., transparency and mechanical strength, required for a liquid crystal color filter.

Figure 6:
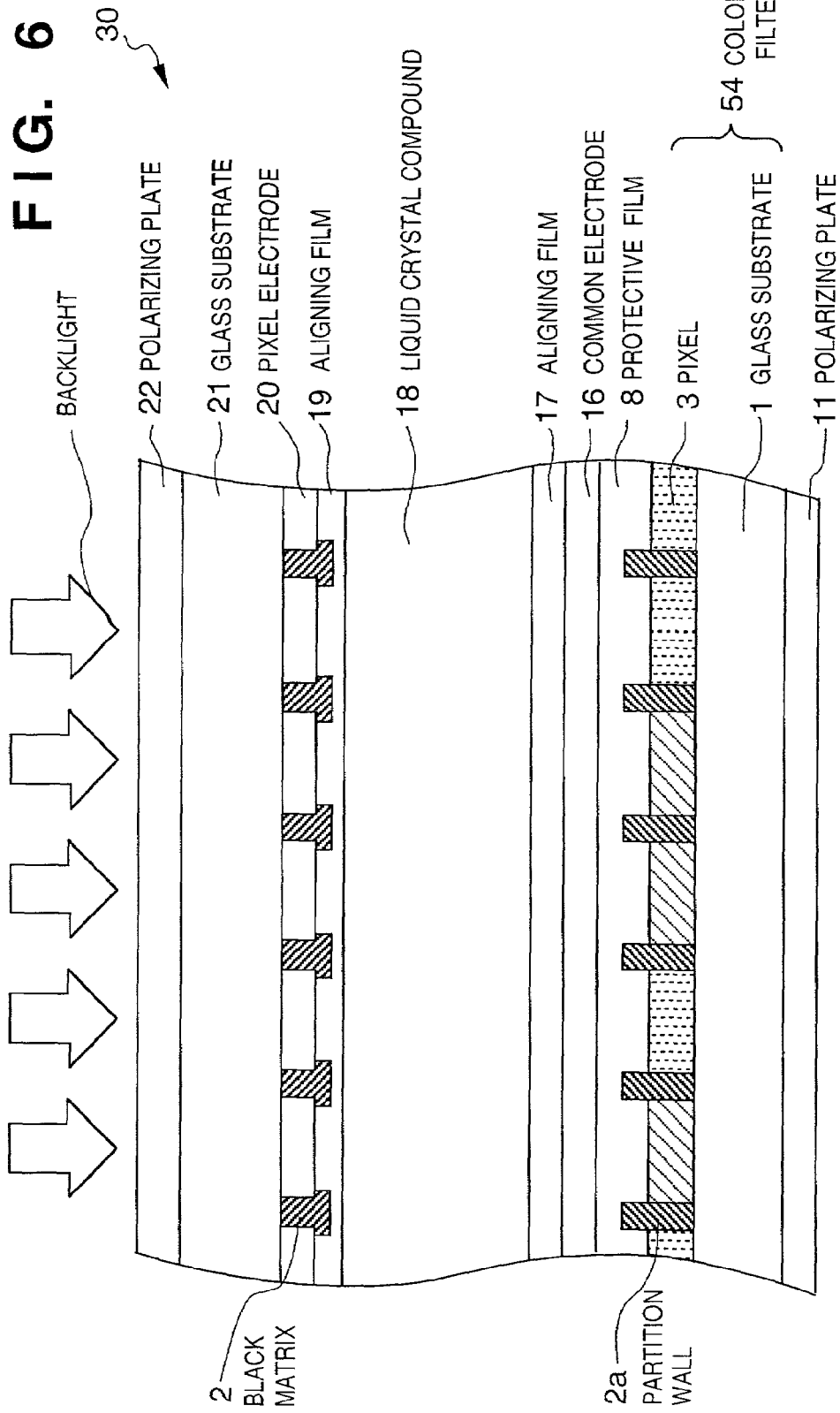
FIG. 6 is a sectional view showing another example of the basic structure of a color liquid crystal display device incorporating the color filter of an embodiment.

On the substrate 1, a partition wall member (partitioning member) 2a for partitioning pixels 3 constituting a color filter is formed. This partition wall member 2a may also be used as a black matrix 2 for improving the color separation characteristics of the respective pixels, or may be used separately from the black matrix 2 as shown in FIG. 6. The partition wall member need not be an integral member and may be constituted by a plurality of layers stacked on each other. Color ink made of a curing resin colored in red (R), green (G), or blue (B) is charged into a pixel 3 which is a recess portion partitioned by the partition wall member 2a by using a corresponding one of ink-jet heads 55b, 55c, and 55d, thereby coloring the pixel 3. As a curing resin forming ink, a photosetting resin, thermosetting resin, or the like may be used. A thermosetting resin is preferably used because a large amount of energy can be easily applied thereto. Note that the ink-jet heads 55*b*, 55*c*, and 55*d* discharge ink onto the substrate 1 while they are scanned with respect to the substrate 1 in the direction indicated by an arrow A in FIG. 4, thereby coloring each pixel 3. The black matrix is preferably made of a black resin material. The surface portions (top portions) of the black matrix preferably have ink repellency.

As an ink-jet system used in the present invention, a bubble-jet type using an electrothermal transucer as an energy generating element, a piezoelectric jet type using a piezoelectric element which undergoes displacement upon reception of electric energy and discharges ink with a pressure change accompanying the displacement, or the like can be used. A coloring area and coloring pattern can be arbitrarily set.

Figure 5:
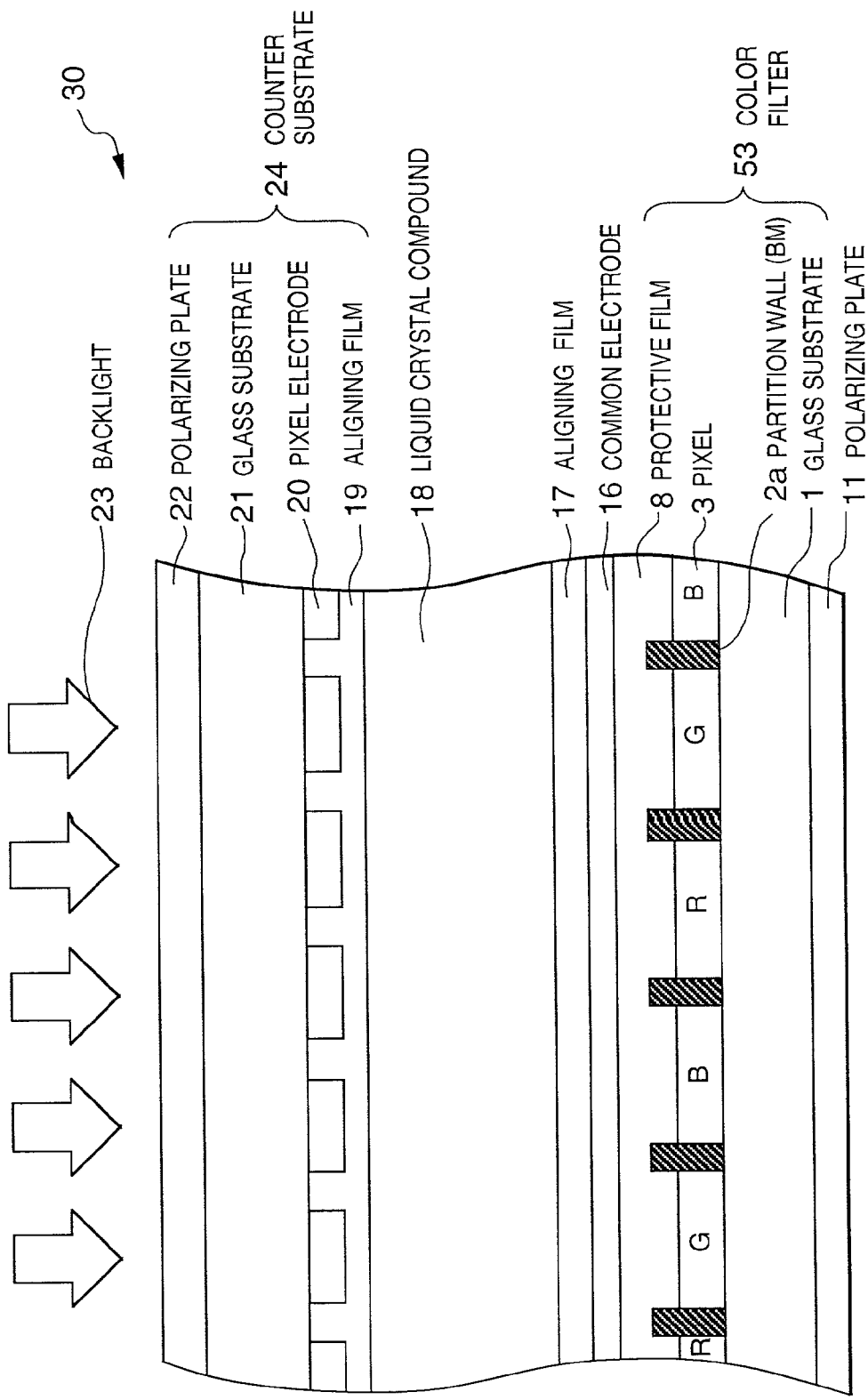
FIG. 5 is a sectional view showing an example of the basic structure of a color liquid crystal display device incorporating the color filter of an embodiment.
Figure 7:
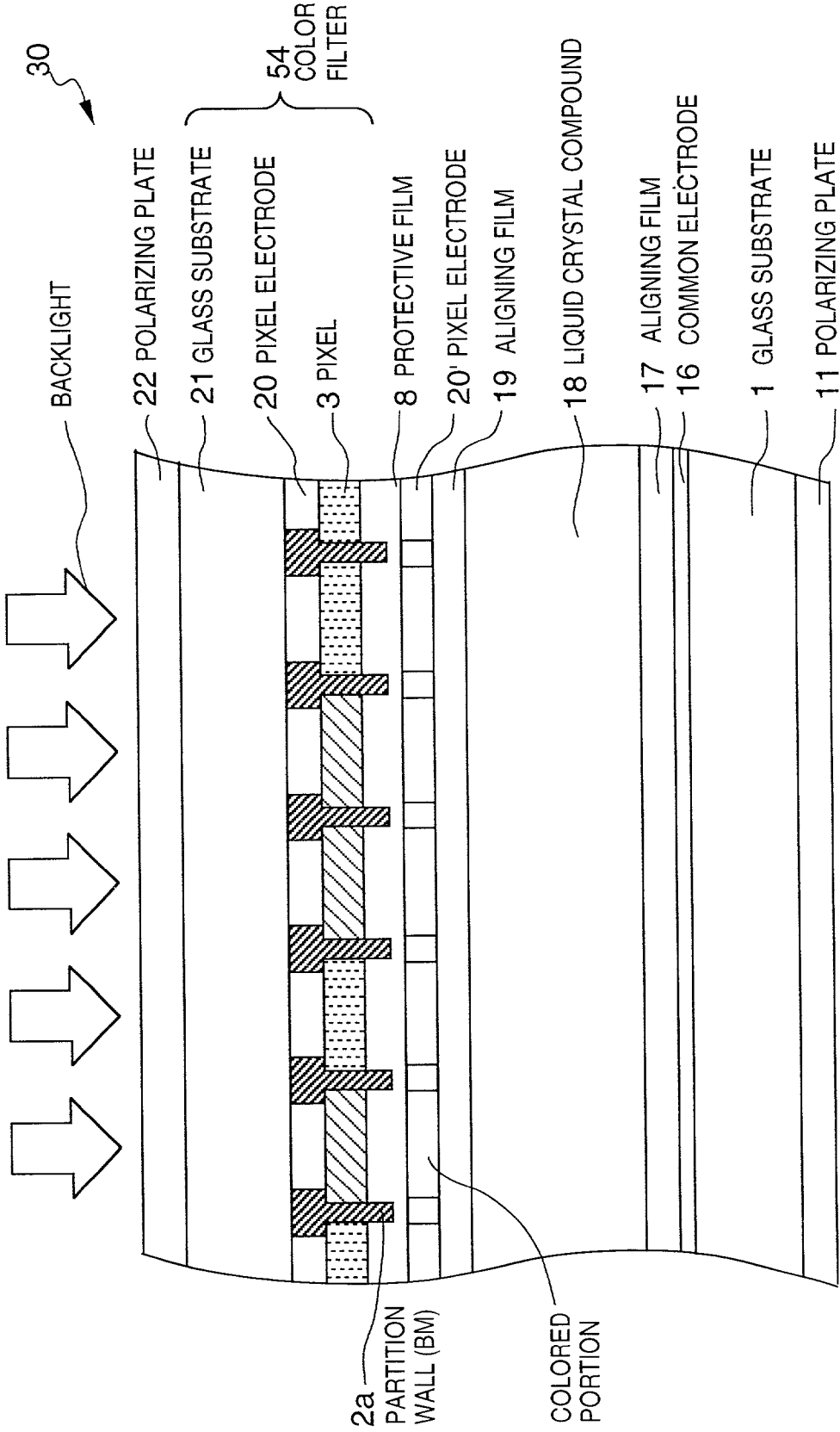
FIG. 7 is a sectional view showing still another example of the basic structure of a color liquid crystal display device incorporating the color filter of an embodiment.

FIGS. 5 to 7 are sectional views showing the basic structure of a color liquid crystal display device 30 incorporating the color filter manufactured by the present invention.

A color liquid crystal display device (color liquid crystal display) of the present invention is formed by joining the color filter substrate 1, manufactured by the color filter manufacturing method according to the present invention, and a counter substrate 21 together, and sealing a liquid crystal compound 18 therebetween. TFTs (Thin Film Transistors) and transparent pixel electrodes 20 are formed on the inner surface of one substrate 21 of the liquid crystal display device in the form of a matrix. The color filter substrate 54 is placed on the inner surface of the other substrate 1 such that R, G, and B coloring materials are positioned to oppose the pixel electrodes. A transparent counter electrode (common electrode) 16 is formed on the entire surface of the color filter. The black matrix 2 is generally formed on the color filter substrate 1 side (see FIG. 5). However, in a BM (Black Matrix) on-array type liquid crystal panel, such a black matrix is formed on the TFT substrate side opposing the color filter substrate (see FIG. 6). Aligning films 19 are formed within the planes of the two substrates. By performing a rubbing process for the aligning films, the liquid crystal molecules can be aligned in a predetermined direction. Polarizing plates 11 and 22 are bonded to the outer surfaces of the respective glass substrates. The liquid crystal compound 18 is charged into the gap (about 2 to 5 $\mu$m) between these glass substrates. As a backlight, a combination of a fluorescent lamp (not shown) and a scattering plate (not shown) is generally used. Display operation is performed by causing the liquid crystal compound to serve as an optical shutter for changing the transmittance for light emitted from the backlight. Note that the liquid crystal compound has the function of changing the amount of light applied on the color filter, and hence can also be called a light amount changing means.

As shown in FIG. 7, colored portions may be formed on the pixel electrodes 20 to implement the function of a color filter. That is, the place where colored portions constituting a color filter are formed is not limited to the surface of a glass substrate.

A case wherein such a liquid crystal display device is applied to an information processing apparatus will be described below with reference to FIGS. 8 to 10. Note that this information processing apparatus is manufactured by connecting an image signal supply means for supplying an image signal to a liquid crystal display device having a color filter manufactured by using the manufacturing method according to the present invention.

Figure 8:
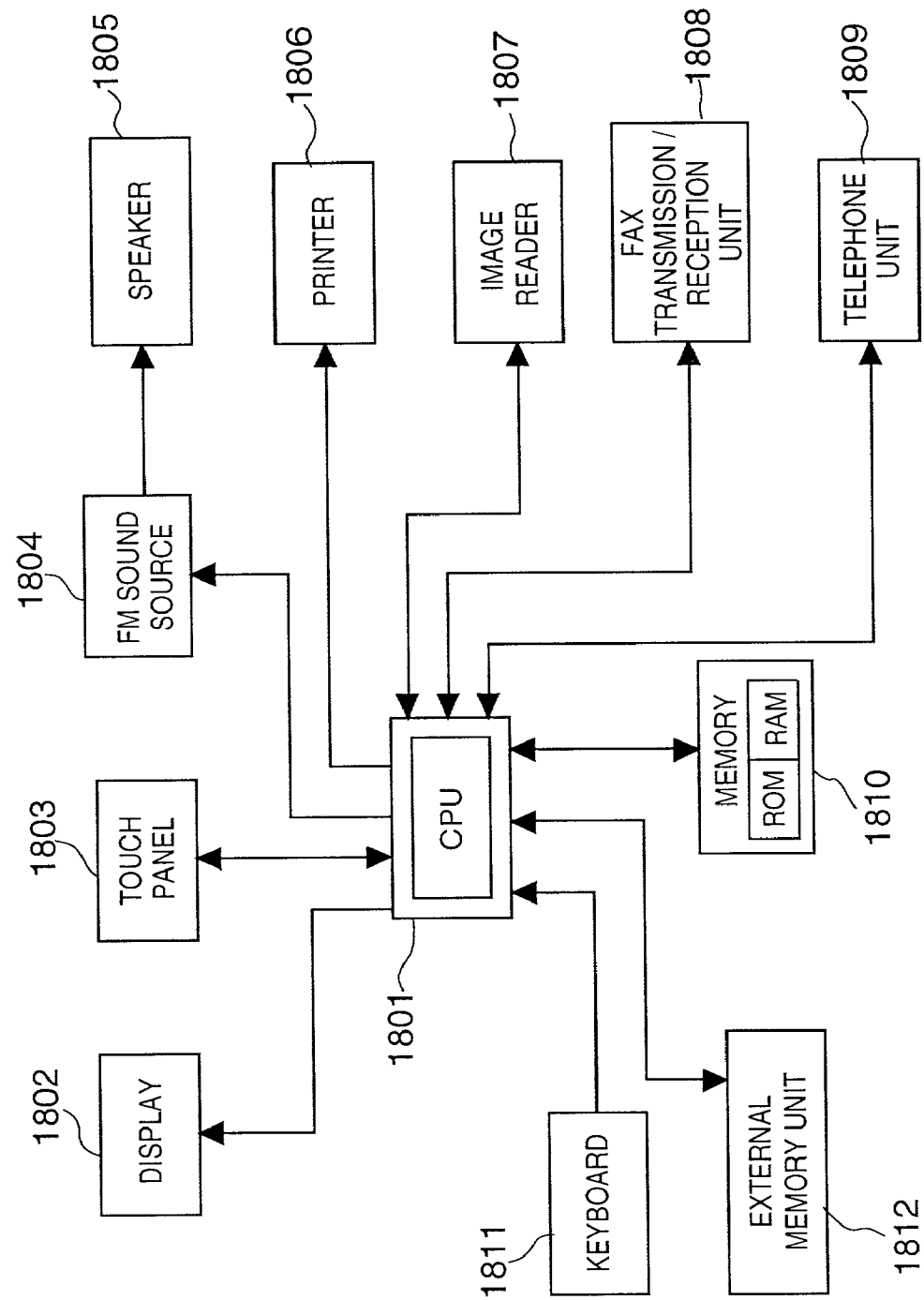
FIG. 8 is a block diagram showing an information processing apparatus using a liquid crystal display device.

FIG. 8 is a block diagram showing the schematic arrangement of an information processing apparatus serving as a wordprocessor, a personal computer, a facsimile apparatus, and a copying machine, to which the above liquid crystal display device is applied.

Referring to FIG. 8, reference numeral 1801 denotes a control unit (image signal supply means) for controlling the overall apparatus. The control unit 1801 includes a CPU such as a microprocessor and various I/O ports, and performs control by outputting/inputting control signals, data signals, and the like to/from the respective units. Reference numeral 1802 denotes a display unit for displaying various menus, document information, and image data read by an image reader 1807, and the like on the display screen; and 1803, a transparent, pressure-sensitive touch panel mounted on the display unit 1802. By pressing the surface of the touch panel 1803 with a finger of the user or the like, item input operation, coordinate position input operation, or the like can be performed on the display unit 1802.

Reference numeral 1804 denotes an FM (Frequency Modulation) sound source unit for storing music information, created by a music editor or the like, in a memory unit 1810 or external memory unit 1812 as digital data, and reading out the information from such a memory, thereby performing FM modulation of the information. An electrical signal from the FM sound source unit 1804 is converted into an audible sound by a speaker unit 1805. A printer unit 1806 is used as an output terminal for a wordprocessor, a personal computer, a facsimile apparatus, and a copying machine.

Reference numeral 1807 denotes an image reader unit for photoelectrically reading original data. The image reader unit 1807 is placed midway along the original convey passage and designed to read originals for facsimile and copy operations and other various originals.

Reference numeral 1808 denotes a transmission/reception unit for the facsimile (FAX) apparatus. The transmission/reception unit 1808 transmits original data read by the image reader unit 1807 by facsimile, and receives and decodes a sent facsimile signal. The transmission/reception unit 1808 has an interface function for external units. Reference numeral 1809 denotes a telephone unit having a general telephone function and various telephone functions such as an answering function.

Reference numeral 1810 denotes a memory unit including a ROM for storing system programs, manager programs, application programs, fonts, and dictionaries, a RAM for storing an application program loaded from the external memory unit 1812 and document information, a video RAM, and the like.

Reference numeral 1811 denotes a keyboard unit for inputting document information and various commands.

Reference numeral 1812 denotes an external memory unit using a floppy disk, a hard disk, and the like. The external memory unit 1812 serves to store document information, music and speech information, application programs of the user, and the like.

Figure 9:
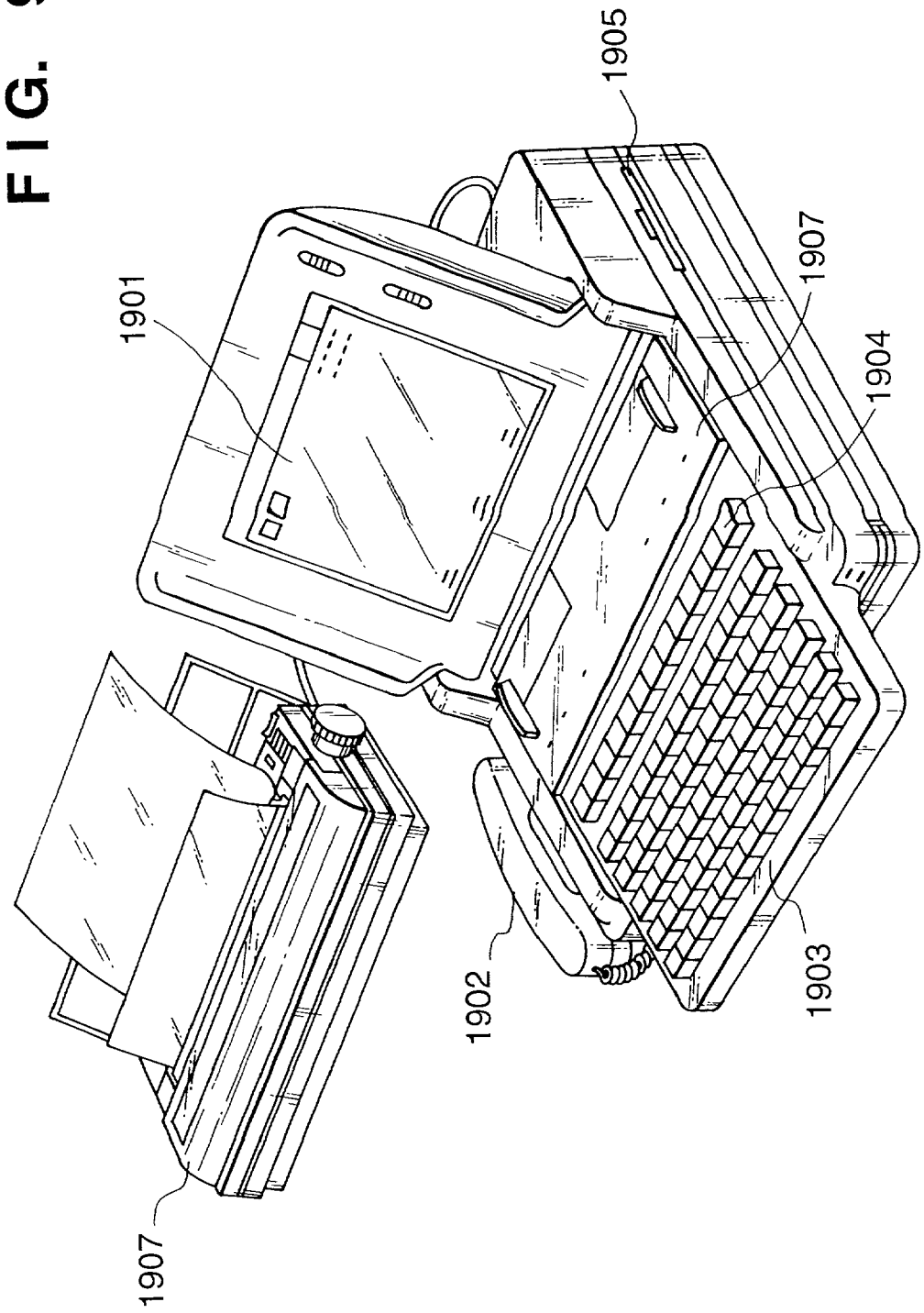
FIG. 9 is a perspective view showing the information processing apparatus using the liquid crystal display device.

FIG. 9 is a schematic perspective view of the information processing apparatus in FIG. 8.

Referring to FIG. 9, reference numeral 1901 denotes a flat panel display using the above liquid crystal display device, which displays various menus, graphic pattern information, document information, and the like. Coordinate input or item designation input operation can be performed on the flat panel display 1901 by pressing the surface of the touch panel 1803 with a finger of the user or the like. Reference numeral 1902 denotes a handset used when the apparatus is used as a telephone set. A keyboard 1903 is detachably connected to the main body via a cord and is used to perform various document functions and input various data. This keyboard 1903 has various function keys 1904. Reference numeral 1905 denotes an insertion port through which a floppy disk is inserted into the external memory unit 1812.

Reference numeral 1906 denotes an original table on which an original to be read by the image reader unit 1807 is placed. The read original is discharged from the rear portion of the apparatus. In a facsimile receiving operation or the like, received data is printed out by an ink-jet printer 1907.

When the above information processing apparatus serves as a personal computer or a wordprocessor, various kinds of information input through the keyboard unit 1811 are processed by the control unit 1801 in accordance with a predetermined program, and the resultant information is output, as an image, to the printer unit 1806.

When the information processing apparatus serves as the receiver of a facsimile apparatus, facsimile information input through the transmission/reception unit 1808 via a communication line is subjected to reception processing in the control unit 1801 in accordance with a predetermined program, and the resultant information is output, as a received image, to the printer unit 1806.

When the information processing apparatus serves as a copying machine, an original is read by the image reader unit 1807, and the read original data is output, as an image to be copied, to the printer unit 1806 via the control unit 1801. Note that when the information processing apparatus serves as the receiver of a facsimile apparatus, original data read by the image reader unit 1807 is subjected to transmission processing in the control unit 1801 in accordance with a predetermined program, and the resultant data is transmitted to a communication line via the transmission/reception unit 1808.

Figure 10:
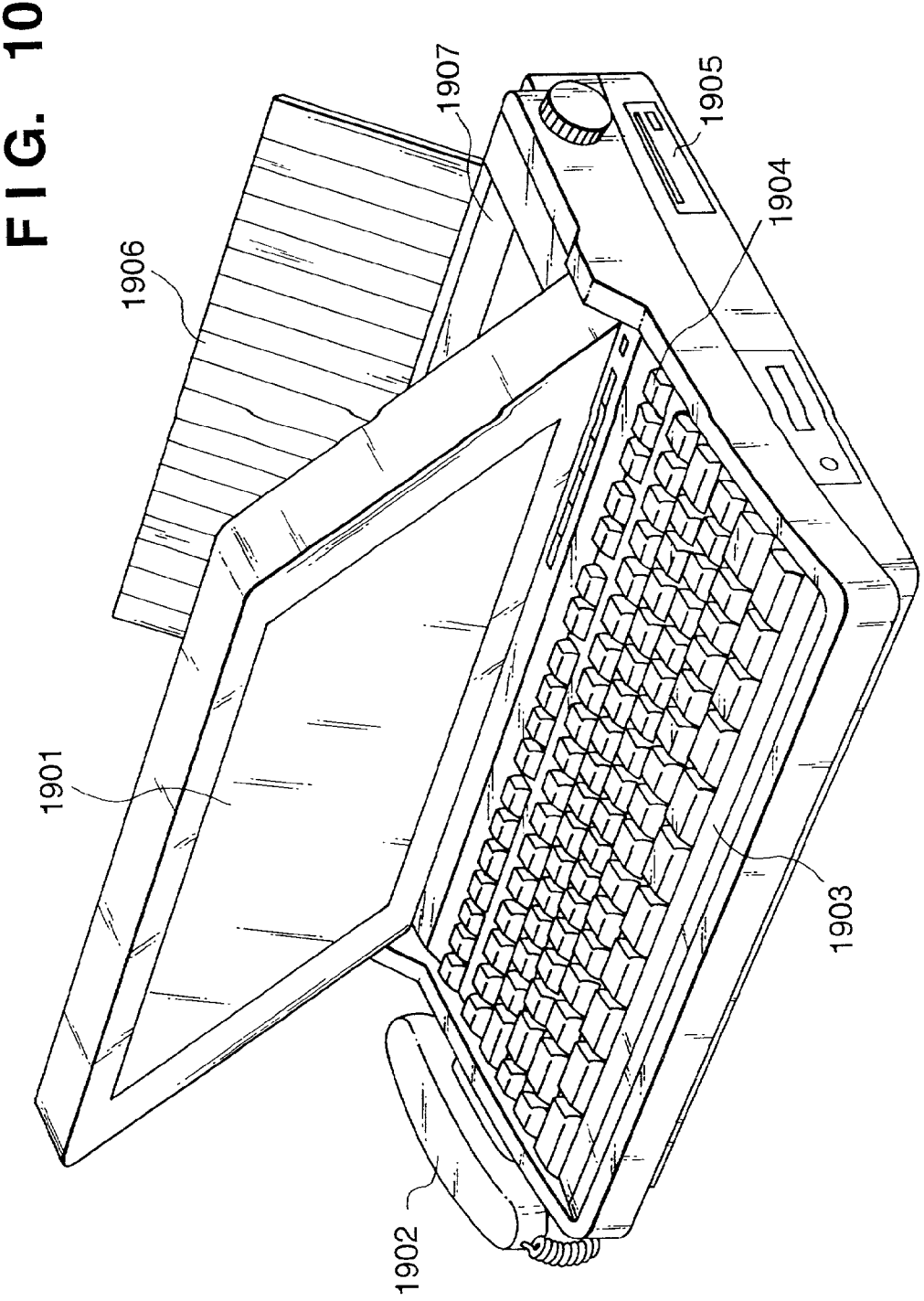
FIG. 10 is a perspective view showing the information processing apparatus using the liquid crystal display device.

Note that the above information processing apparatus may be designed as an integrated apparatus incorporating an ink-jet printer in the main body, as shown in FIG. 10. In this case, the portability of the apparatus can be improved. The same reference numerals in FIG. 10 denote parts having the same functions as those in FIG. 9. Such an apparatus having a display device is manufactured by ① manufacturing a color filter by the manufacturing method according to the present invention, ② manufacturing a display device by filling the space between the color filter and a counter substrate with a liquid crystal compound, and ③ connecting an image signal supply means to the display device.

FIGS. 11A to 11E are sectional views of the substrate 1 in FIG. 4 when viewed from its side, showing the steps in manufacturing a color filter, which is a characteristic feature of this embodiment. FIGS. 11A to 11E show a case wherein the partition wall member 2a is also used as a black matrix.

Figure 11A:
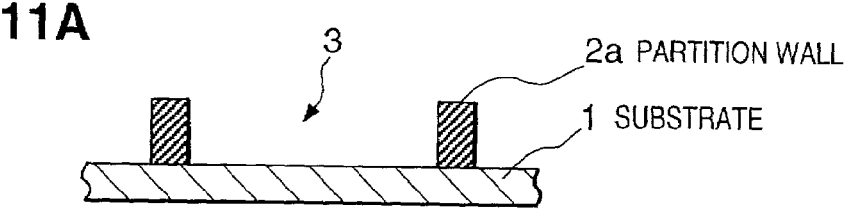
FIGS. 11A to 11E are sectional views showing the steps in manufacturing a color filter according to the first embodiment.

FIG. 11A shows the substrate 1 and partition wall member 2a before the supply of ink. In this embodiment, the partition wall member 2a also serves as a black matrix (to be referred to as a "BM" hereinafter) of a color filter and is made of a black resin. In this embodiment, a glass substrate is used as the substrate 1. However, the present invention is not limited to this as long as mechanical and optical characteristics required for the substrate are satisfied.

Figure 11B:
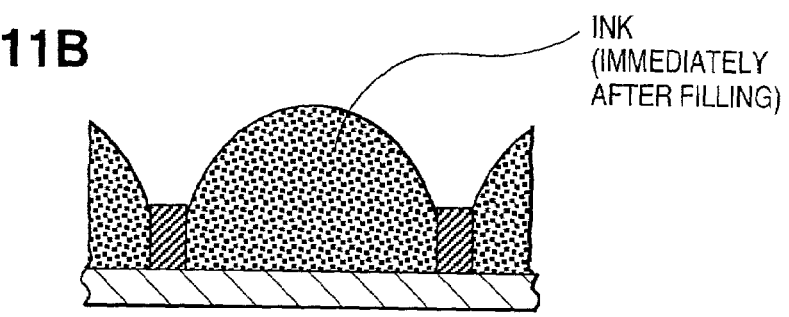

FIG. 11B shows how a recess portion formed by the partition wall member 2a on the substrate 1 is filled with curing ink in a step before the ink volume reducing step (curing step). Ink in this embodiment is made of a coloring material such as a dye or pigment, resin, and solvent. The solvent consists of ethylene glycol, diethylene glycol, and water. As shown in FIG. 11B, the top portion of an ink surface is preferably higher in level than the top portion of each partition wall in consideration of the surface planarization effect.

The following are the compositions of the inks used in this embodiment. With the use of either of the two sets of inks given below, color filters with excellent planarities as will be described below could be manufactured. In addition, this embodiment uses inks each containing evaporative first components (e.g., ethylene glycol, diethyleneglycol, and water) and second components (e.g., a pigment, dye, and resin) which become solid portions after evaporation of the first components.

(Ink Composition ①)

Red ink

| | |
|---|---|
| Red dye | 7 parts by weight |
| acrylic resin | 4.5 parts by weight |
| ethylene glycol | 20 parts by weight |
| diethylene glycol | 20 parts by weight |
| pure water | balance |

Green ink

| | |
|---|---|
| Red dye | 7.5 parts by weight |
| acrylic resin | 4 parts by weight |
| ethylene glycol | 20 parts by weight |
| diethylene glycol | 20 parts by weight |
| pure water | balance |

Blue ink

| | |
|---|---|
| Blue dye | 5.5 parts by weight |
| acrylic resin | 6 parts by weight |
| ethylene glycol | 20 parts by weight |
| diethylene glycol | 20 parts by weight |
| pure water | balance |

(Ink Composition ②)

Red ink

| | |
|---|---|
| Red dye | 7 parts by weight |
| acrylic resin | 4.5 parts by weight |
| diethylene glycol | 40 parts by weight |
| pure water | balance |

Green ink

| | |
|---|---|
| Red dye | 7.5 parts by weight |
| acrylic resin | 4 parts by weight |
| diethylene glycol | 40 parts by weight |
| pure water | balance |

Blue ink

| | |
|---|---|
| Blue dye | 5.5 parts by weight |
| acrylic resin | 6 parts by weight |
| diethylene glycol | 40 parts by weight |
| pure water | balance |

Note that inks that can be used in the present invention are not limited to them. The compositions of the inks described above are merely examples that can be used in the present invention.

Figure 11C:
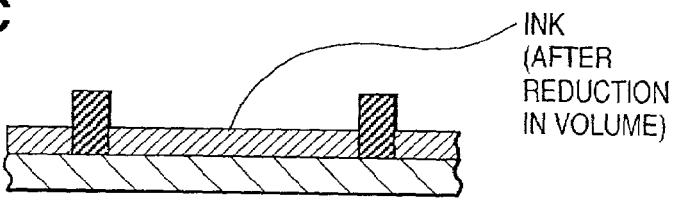

FIG. 11C shows a state immediately after the ink volume reducing step. In this embodiment, a hot plate is used to heat ink at 90° C. for 10 min to evaporate water in the ink. Thereafter, the hot plate is used to heat the ink at 230° C. for 30 min to evaporate the residual solvent and cure the resin. However, the ink volume reducing method is not limited to this. In this embodiment, ink is heated in two steps at different heating temperatures. In the above description, volatile components (evaporative components) in the ink are evaporated to a certain degree in the first step. In the second step, the residual volatile components are evaporated. The volatile components in ink may be evaporated completely. In contrast to this, the volatile components may not be completely evaporated after the second step. In addition, heating need not be performed in two steps, and may be performed in one step, three steps, four steps, . . . , or N steps. Alternatively, a process of gradually raising the heating temperature may be employed.

As shown in FIG. 11C, when the arithmetic mean of the levels of the surface of a solid portion (to be also referred to as a colored portion hereinafter) formed after the ink volume reducing step is about 50% of the height of each partition wall, the surface of the solid portion (colored portion) becomes almost perfectly planarized. In practice, however, a certain degree of unevenness is allowed in accordance with application purposes. Note that this solid portion is formed after volatile components in the ink are evaporated by heating. The solid portion includes not only a portion from which volatile components are completely evaporated but also a portion from which volatile components are not completely evaporated but are mostly evaporated.

According to the present invention, the surface of each solid portion can be planarized at an arbitrary thickness of the solid portion by setting the thickness of the sold portion (colored portion) to a certain value in accordance with the height of each partition wall. On substrates on which BMs whose distances from the bottom portions to the top portions were 0.58 $\mu$m, 1.14 $\mu$m, and 2.42 $\mu$m, respectively, color filters respectively having solid portions whose mean distances from the bottom surfaces to the top surfaces were 0.279 $\mu$m (corresponding to 48% of the distance from the bottom portion to the top portion), 0.588 $\mu$m (corresponding to 53% of the distance from the bottom portion to the top portion), and 1.39 $\mu$m (corresponding to 57% of the distance from the bottom portion to the top portion) were actually formed, the respective color filters have planarized solid portion surfaces.

A procedure for setting the thickness of each colored portion (solid portion) to a certain value in this embodiment will be described below.

Figure 15:
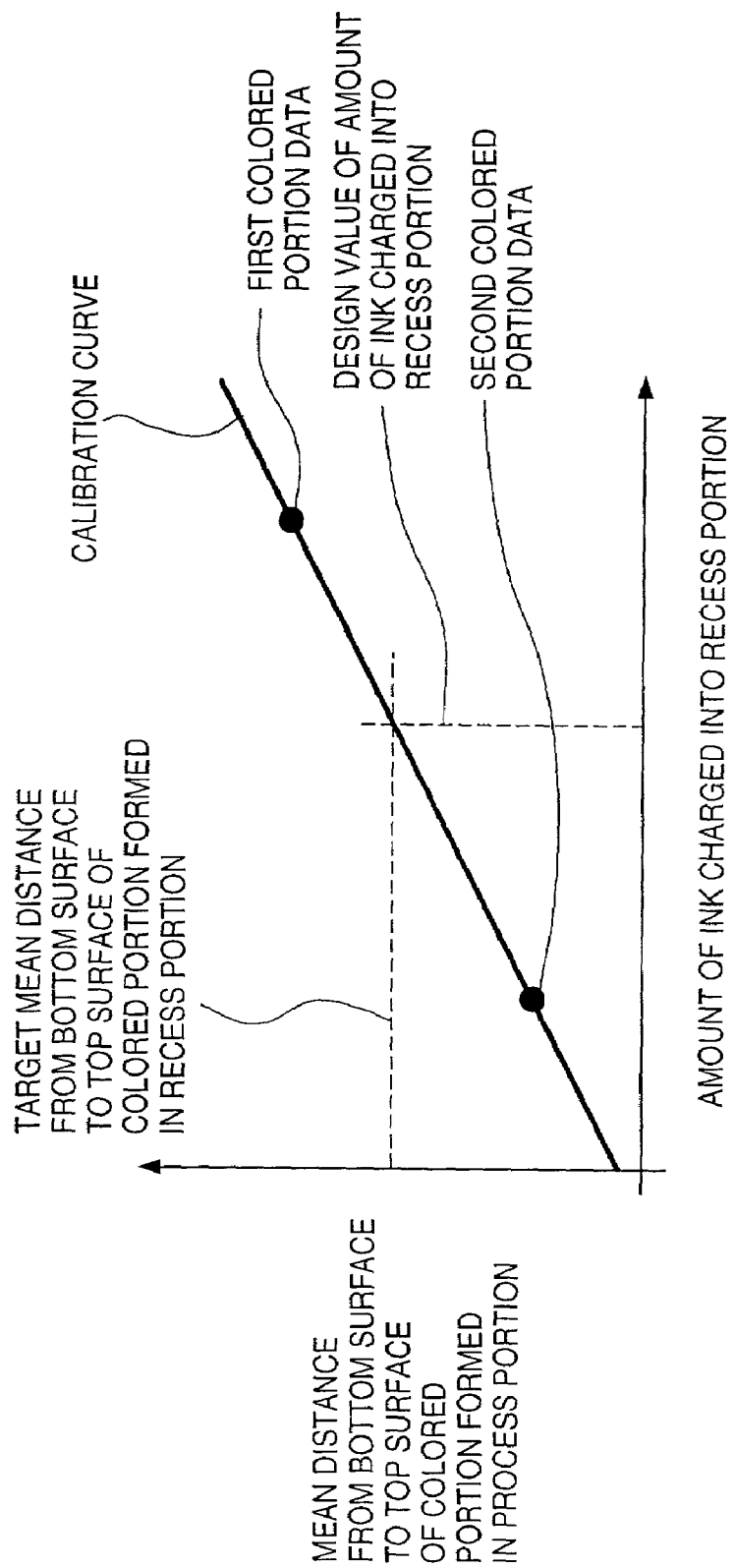
FIG. 15 is a graph for explaining a method of determining the amount of ink supplied.

First of all, a first recess portion is filled with a first amount of ink to form a first colored portion, and a second recess portion is filled with a second amount of ink to form a second colored portion. Then, the distances from the bottom surface to the top surface of the first colored portion formed in the first recess portion were measured, and the mean value of the measured distances is obtained. The distances from the bottom surface to the top surface of the second colored portion formed in the first recess portion were measured, and the mean value of the measured distances is obtained. Data (calibration data or calibration curve) representing the relationship between these two mean values and the corresponding ink amounts (first and second ink amounts) is created. More specifically, points representing the first and second colored portions are plotted on a graph taking, as axes, the mean distance from the bottom surface to the top surface of each colored portion formed in a corresponding recess portion and the amount of ink charged into each recess portion (FIG. 15 shows an example of this graph). A straight line passing through these two points is a calibration curve representing the relationship between the mean distance from the bottom surface to the top surface of each colored portion formed in a corresponding recess portion and the amount of ink charged into each recess portion.

After the formation of a calibration curve, the mount of ink charged into each recess portion is determined on the basis of this calibration curve such that the mean distance from the bottom surface to the top surface of each colored portion (the mean thickness of each colored portion) falls within a predetermined range. In this case, the predetermined range is 20% (inclusive) to 80% (exclusive) of the height of each partition wall (the distance from the bottom portion to the top portion of the partition wall). If the mean value is less than 20%, the shape of the surface of the colored portion become excessively concave. If the mean value is 80% or more, the shape of the colored portion becomes excessively convex. Note that FIGS. 19A to 19I show the relationship between the ratio of the thickness of a colored portion to the height of each partition wall and the surface shape of the colored portion. More specifically, when the thickness of the colored portion falls outside the range of 20% to 80% of the height of each partition wall, the degree of unevenness of the surface of the colored portion falls outside the allowable range, resulting in difficulty in planarizing the colored portion. In this embodiment, therefore, the amount of ink charged into each recess portion is determined to set the thickness of the colored portion to 20% to 80% of the height of each partition wall. If the colored portion needs to be further planarized, the above predetermined range may be set to 40% to 60% of the height of each partition wall, and the amount of ink may be determined to set the thickness of the colored portion to 40% to 60% of the height of each partition wall. If further planarization is required, the above predetermined range may be set to about 50% of the height of each partition wall, and the amount of ink may be determined to set the thickness of the colored portion to about 50% of the height of each partition wall.

Color filters were manufactured while the mean distance from the bottom surface to the top surface of each colored portion and the distance from the bottom portion to the top portion of each BM were variously changed. Liquid crystal display devices incorporating these color filters were prepared. For example, tests on these liquid crystal display devices were then carried out to check whether changes in density are conspicuous and the density looks uneven when the user obliquely sees the display devices. In these tests, when the arithmetic mean of the distances from the bottom surface to the top surface of each colored portion (the thickness of each colored portion) with reference to the bottom surface of the colored portion (the interface between the colored portion and the substrate 1 in this case) was 20% (inclusive) to 80% (exclusive) of the height of each partition wall (i.e., the distance from the bottom portion to the top portion), changes in density were inconspicuous. In addition, when this arithmetic mean is 40% (inclusive) to 60% (exclusive) of the height, the corresponding apparatus was determined as a nondefective product even by evaluation based on a test standard set in consideration of an application that demands a higher precision. More preferably, the thickness of each colored portion was about 50% of the height of each partition wall.

Note that information about the determined amount of ink to be charged into each recess portion and the created calibration data (data representing the relationship between the thickness of each colored portion and the amount of ink to be charged) are temporarily stored in a memory unit (data storage unit). In producing color filters, the previously obtained information about ink amounts may be read out from the data storage unit to be used.

According to the above description, the amount of ink to be charged is determined to set the thickness of each colored portion within the predetermined range. In practice, however, it is preferable that a target value as the thickness of each colored portion be set in advance, as shown in FIG. 15, and the amount of ink to be charged be obtained on the basis of the above calibration curve to match the target value, and information about an ink amount as a design value be stored in the data storage unit in advance. In manufacturing color filters, ink is charged into each recess portion in the ink amount as the design value.

Figure 16:
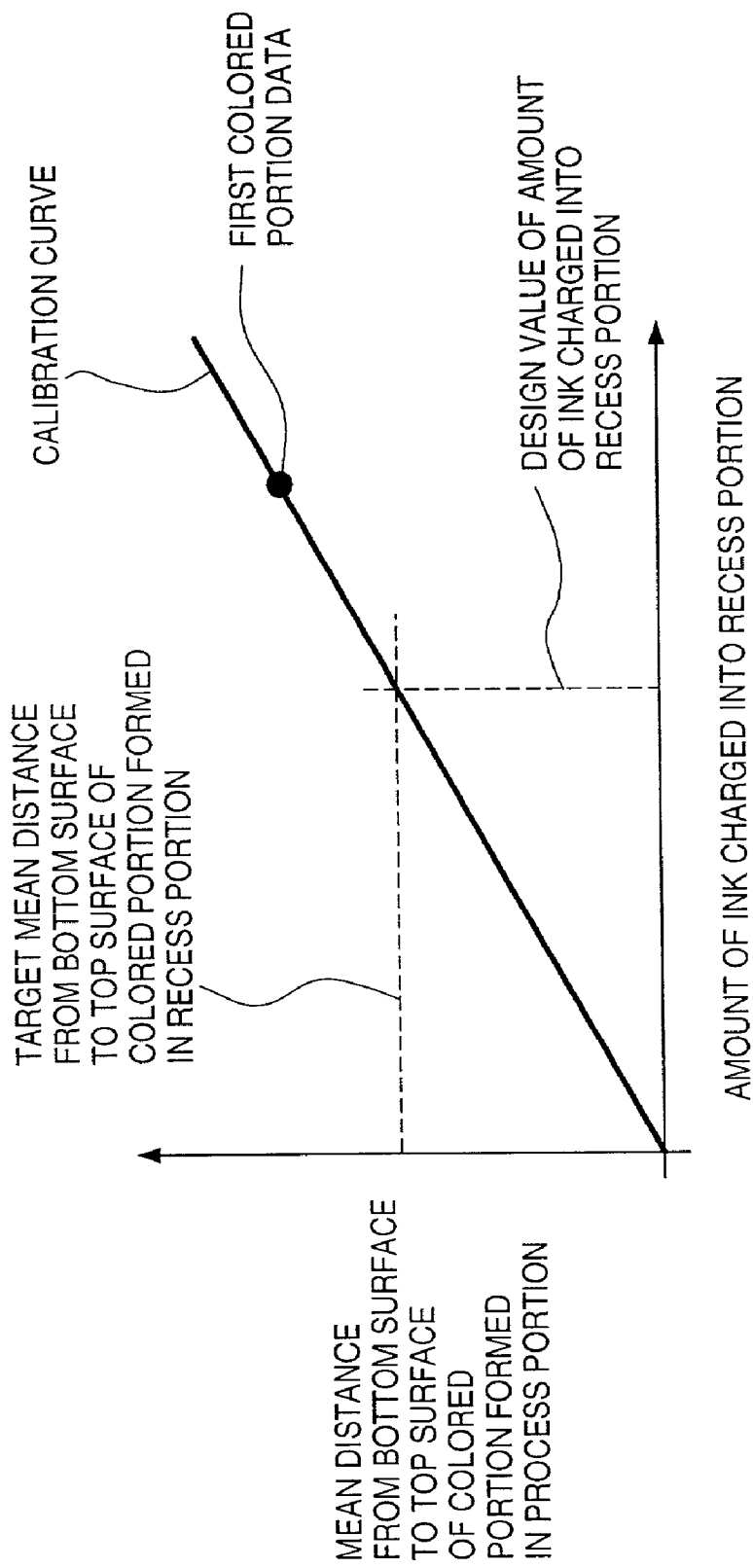
FIG. 16 is a graph for explaining a method of determining the amount of ink supplied.

According to the above procedure, to obtain a calibration curve, two sets of data including the mean distances from the bottom surfaces to the top surfaces of colored portions formed in recess portions and the amounts of ink charged into the recess portions are obtained, and the two corresponding points are plotted. However, the method of forming a calibration curve is not limited to this. For example, one set of data may be obtained to plot only one point, and a calibration curve may be formed by connecting this point and the origin. In this case, when the amount of ink to be charged is 0, the mean distance from the bottom surface to the top surface of each colored portion formed in a recess portion is assumed to be 0 (FIG. 16 shows an example of this graph). A merit of the method of plotting only one point is that the procedure for determining the thickness of a colored portion is simplified as compared with the method of plotting two points. Alternatively, three or more sets of data including the mean distances from the bottom surfaces to the top surfaces of colored portions formed in recess portions and the amounts of ink to be charged into the recess portions may be obtained, and a calibration curve may be obtained by plotting the three or more corresponding points. A merit of this method is that the thickness of each solid portion can be set more accurately, even though the procedure becomes slightly complicated. Note that the least squares method is preferably used when a calibration curve is to be obtained from three or more sets of data.

Note that such a calibration curve may be formed by an apparatus other than the color filter manufacturing apparatus or the color filter manufacturing apparatus itself. This calibration curve is preferably updated every time the type of ink to be used is changed. This is because the degree of evaporation varies depending on the type of ink, and the relationship between the amount of ink to be charged and the thickness of each colored portion changes. In addition, when, for example, the material for a BM, the thickness of a BM, or the size of each pixel is to be changed, the calibration curve is preferably updated. That is, a new calibration curve is preferably formed every time the type of color filter to be manufactured is changed. In contrast to this, when the type of ink to be used, the type of color filter to be manufactured, or the like is not changed, a calibration curve formed before the manufacturing process may be used, and information about the amount of ink to be changed, which is obtained in advance on the basis of this calibration curve, may be used. As described above, when color filters of the same type are to be manufactured by using the same material, the information about the amount of ink to be changed, which is obtained in advance, can be repeatedly used. That is, any number of color filters can be manufactured under this condition.

In this embodiment, as a BM material, V-259BK739P-007X available from Shin Nittetsu Kagaku Inc. is used. However, the BM material is not limited to this. For example, CK-S171VX4 available from Fujifilm Olin Co., Ltd. can be used. Color films that are equal in quality can be obtained by using either V-259 BK739P-007X available from Shin Nittetsu Kagaku Inc. or CK-S171VX4 available from Fujifilm Olin Co., Ltd.

In actually designing color filters, it is often preferable that the height of each partition wall be set in accordance with a desired thickness of each solid portion, in consideration of design conditions satisfying other performance specifications.

In order to prevent the planarities of the surface of each solid portion from being impaired by factors such as contamination of the surface of the substrate, it is preferable that the distance from the bottom portion to the top portion of each partition wall be larger than 1 $\mu$m (more preferably, 1.5 $\mu$m) or the mean distance from the bottom surface to the top surface of each solid portion be larger than 0.6 $\mu$m (more preferably, 0.9 $\mu$m).

Figure 18:
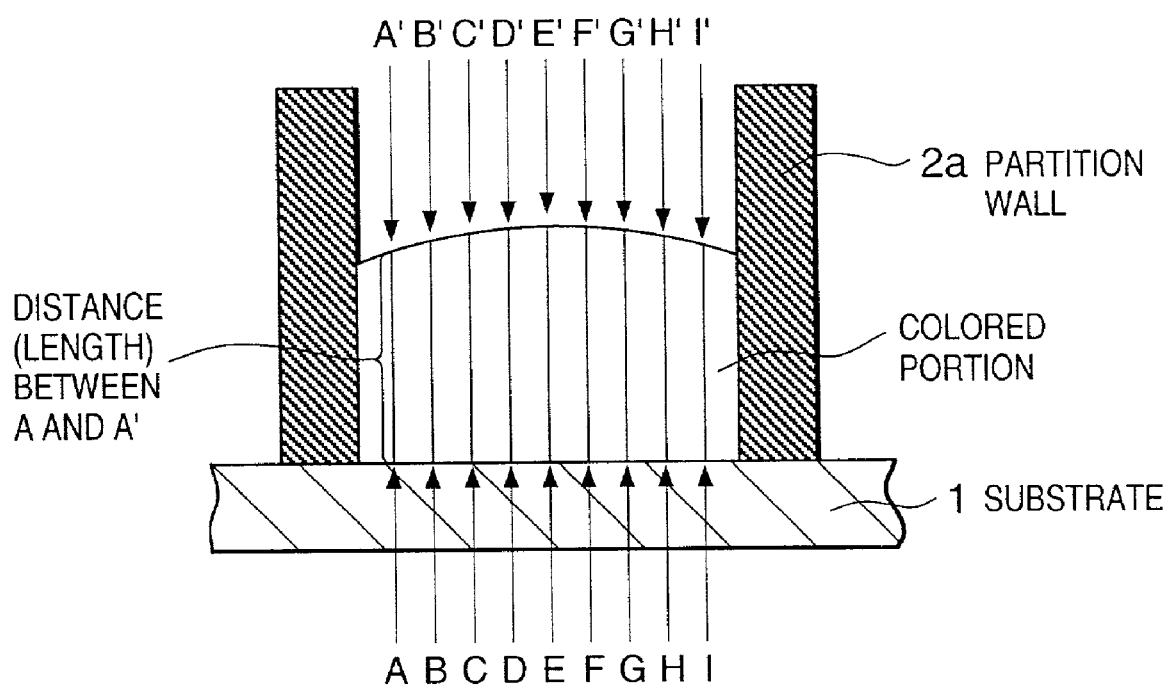
FIG. 18 is a sectional view for explaining how the mean distance from the bottom surface to the top surface of each colored portion is obtained.

The above ink surface is measured by cutting a manufactured color filter and observing its cross-section with a scanning electron microscope. The arithmetic mean of the measurements is defined as the arithmetic mean of the levels of points obtained by dividing the distance between partition walls of the partition wall member 2a, which form a recess portion, into 10 equal parts. More specifically, as shown in FIG. 18, the colored portion is divided into 10 equal parts at points A, B, C, D, E, F, G, H, and I, the thicknesses of the colored portion at the points A to I are measured, and the mean value of the measurements is obtained. That is, the distances between the point A and a point A', between the point B and a point B', . . . , between the point I and a point I' are obtained, and the mean value of the nine obtained values is calculated. In this specification, this means value is defined as the thickness of the colored portion (the distance from the bottom surface to the top surface of the colored portion).

According to an actual production method, a measurement means is used in a production step after the ink volume reducing step to measure and determine whether the arithmetic mean of the levels of the ink surface after the ink volume reducing step falls within the range of 20% to 80% or 40% to 60% of the thickness of the partition wall member 2a even with variations and defects in the production step, and the respective steps are managed in accordance with the determination result. This can effectively increase the yield.

More specifically, as a management method, a method of using the step of controlling other steps may be effectively used. For example, when the above condition is not satisfied, the amount of ink to be supplied afterward for a color filter may be increased/decreased or the apparatus may be stopped on the basis of the corresponding information. As a measurement means used in this case, a contact type measurement means such as a dial gage may be used, but a noncontact type measurement means such as a laser measuring device or laser microscope is preferably used because it has no influence, e.g., giving no damage, on the substrate.

Although the measurement target sample may not be fed to the subsequent step, the sample is preferably fed to the subsequent step in consideration of an increase in yield. In this case, as a measurement means, a noncontact type measurement means typified by a laser measuring device or laser microscope is especially preferable. In addition, measurement is preferably performed by using an arbitrary point on an ink surface because of easy measurement.

As described above, in a production step after the ink volume reducing step, a test is carried out to check whether the mean distance from the bottom surface to the top surface of each colored portion falls within the predetermined range (20 to 80% or 40 to 60% of the height of each partition wall), thereby reducing the number of defective products. This test may be performed every time one color filter is produced or a predetermined number of (e.g., 100) color filters are produced. Alternatively, the test may be run at predetermined time intervals (e.g., one hour, day, or month). In addition, the above test may be run to check the thickness of at least one colored portion of a plurality of colored portions formed on one color filter. When the test precision is to be increased, the number of colored portions to be tested may be increased. When the manufacturing time is to be shortened, only one colored portion may be tested. If it is determined from a test that the thickness of each colored portion does not fall within the predetermined range, adjustment may be performed to make the thickness fall within the predetermined range.

Figure 11D:
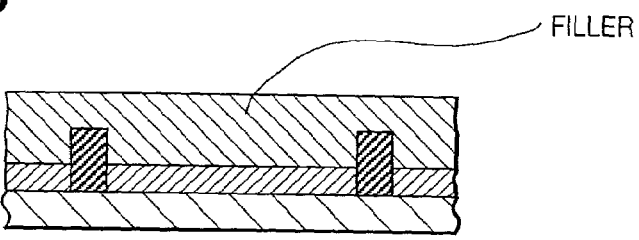
Figure 11E:
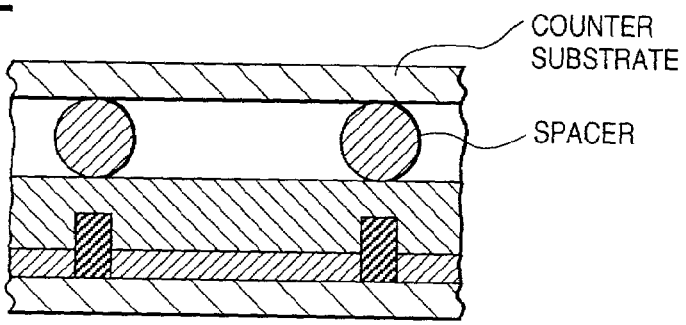

FIG. 11D shows a state wherein each recess portion defined by the partition wall member 2a and the ink surface is filled with a filler to planarize the entire surface of the color filter. As a method of filling each recess portion with a filler, for example, a method of applying a filler by using a spin coating method, a slit coating method, an ink-jet method, or a method called a spin & slit method is suitably used. Since a filler having a high viscosity is generally high in performance in planarizing an uneven surface, the spin coating, slit coating, or spin & slit method is more suitable. Furthermore, the slit coating or spin & slit method is more suitable to cut wastes of filler.

A filler is preferably a transparent or light-transmitting material. In addition, a filler is preferably a material exhibiting a high planarizing effect. As a material with a high planarizing effect, a material that melts upon heating, a so-called heat melting type material, can be suitably used. The use of such a material having a high planarizing effect will decrease the thickness of a filler on a BM and increase the thickness of a filler on a color layer. This also makes it possible to planarize the surface of a protective portion. By planarizing the protective portion formed on the colored portions and BM, any stepped portions of a surface contacting the liquid crystal layer made of a liquid crystal compound can be reduced. This makes it possible to prevent defects such as an aligning failure due to stepped portions of the surface contacting the liquid crystal layer. In this embodiment, a protective film material (V-259EH-134X) available from Shin Nittetsu Kagaku Inc. was used as a filler satisfying the above condition, and each recess portion was coated with this material such that the mean thickness of the protective portion became 1 $\mu$m.

The above filler is a material for forming a protective portion for protecting the colored portions, and hence can be referred to as a protective material. In addition, this filler is a material for planarizing the color filter, and hence can be referred to as a planarizing material.

In this embodiment, only gaps defined between the top portions of the partition wall member and the surfaces of colored portions may be filled with the above protective material or planarizing material to form protective portions on only the colored portions. Alternatively, the surfaces of the colored portions and the top portions of the partition wall member may be coated with the above protective material or planarizing material to form a protective portion on the colored portions and partition wall member. The latter structure is preferable because a protective portion can be easily formed. In the latter case, since the surface of the protective portion is planarized, the thickness (the distance from the bottom surface to the top surface) of a protective portion formed on each top portion of the partition wall member becomes smaller than the thickness (the distance from the bottom surface to the top surface) of a protective portion formed on the surface of each colored portion. When a protective portion on each partition wall is thinner than a protective portion on each colored portion, the degree of bite of a spacer can be decreased, and the thickness of the liquid crystal layer can be made uniform. The thickness of a protective portion on each partition wall is preferably 0.1 $\mu$m (inclusive) to 0.5 $\mu$m (exclusive) whereas the thickness of a protective portion on each colored portion is preferably 0.5 $\mu$m (inclusive) to 3 $\mu$m (exclusive).

As described above, with the use of a heat melting type material as a protective material for a protective portion, planarities required for a color filter can be obtained.

In addition, as compared with the prior art, this embodiment can keep the thickness of a liquid crystal layer more constant. This merit will be described with reference to FIGS. 17A and 17B. FIGS. 17A and 17B are enlarged views of liquid crystal display devices incorporating color filters. FIG. 17A shows this embodiment. FIG. 17B shows the prior art. Compare the structures shown in FIGS. 17A and 17B with each other. The protective portions on the colored portions in the two structures are equal in thickness. The protective layer on the BM in FIG. 17A is thinner than that in FIG. 17B. Since a protective portion is required to have transparency, no pigment is mixed into the resin. In contrast to this, since a BM functions as a light-shielding portion, the BM can be made harder than the protective portion by mixing a pigment or the like into the resin. Assume that the BM is made harder than the protective portion in this manner, and an external force acts on the substrate 1 or protective portion 8 to crush the liquid crystal layer 18 so as to make a spacer 31 bite into the color film. In this case, in the structure shown in FIG. 17A, since the protective portion formed on the BM harder than the protective portion is thin, the degree of bite of the spacer is low. In the structure shown in FIG. 17B, since the protective portion formed on the BM is thick, the degree of bite of the spacer is higher than that in the structure shown in FIG. 17A. As described above, in this embodiment having the structure shown in FIG. 17A, since the degree of bite of a spacer is decreased as compared with the conventional structure shown in FIG. 17B, the thickness of the liquid crystal layer does not easily change. This makes it possible to reduce display disturbances. Note that even if the thickness of the protective portion on the BM is decreased as shown in FIG. 17A, the protection performance for each colored portion does not deteriorate.

The above effects, i.e., decreased degree of bite of a spacer, constant thickness of the liquid crystal layer, and reduced display disturbance, are especially noticeable in a liquid crystal display device having a spacer disposed only on a BM. However, the spacer may be arranged on the other portion than the BM. Further, the spacer may be adhered on the color filter or the opposite substrate. The dimensions of the respective components of this embodiment were set as follows. The thickness of the liquid crystal layer was 5 $\mu$m; the thickness of the aligning film on the color filter side, 30 nm; the thickness of the common electrode, 0.15 $\mu$m; the thickness of the protective portion (means value of the overall color filter), 1 $\mu$m; the thickness of each colored portion, 1 $\mu$m; and the thickness of the glass substrate, 0.7 mm.

As described above, according to this embodiment, planarization of each colored portion and protective portion can be realized, and the thickness of the liquid crystal layer can be made uniform. In addition, since the color filter manufacturing process does not include the step of removing a BM, the manufacturing time can be shortened, and the productivity can be improved.

Second Embodiment

Figure 12A:
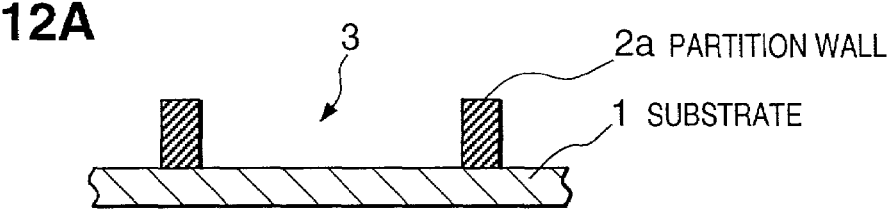
FIGS. 12A to 12E are sectional views showing the steps in manufacturing a color filter according to the second embodiment.
Figure 12B:
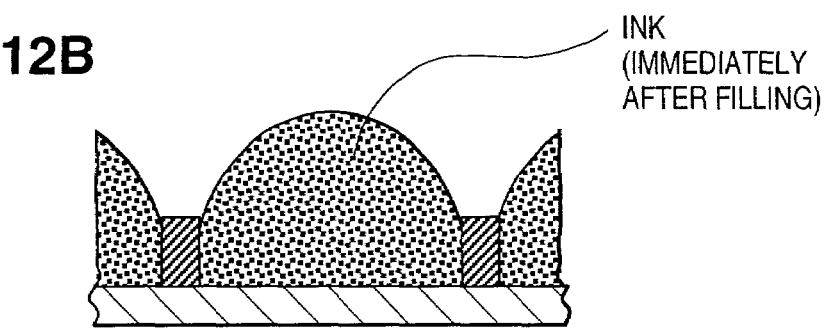
Figure 12C:
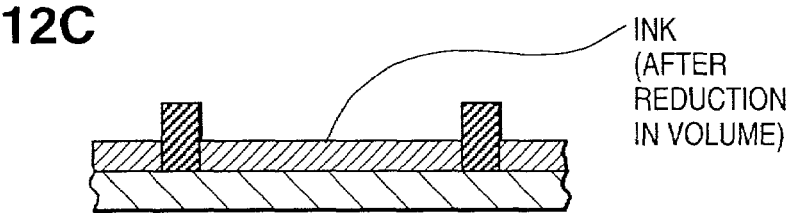
Figure 12D:
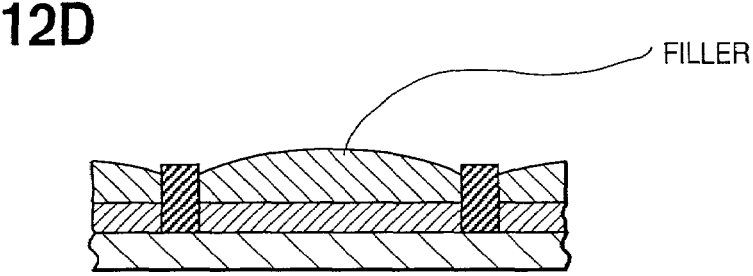
Figure 12E:
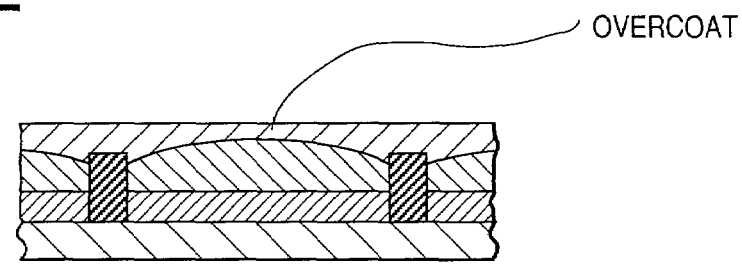
Figure 13A:
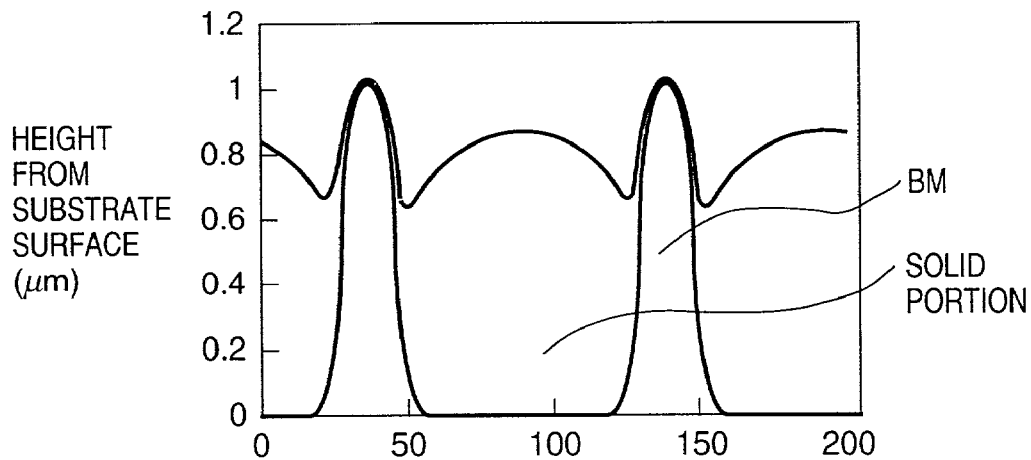
FIGS. 13A to 13C are graphs showing the relationship between the planarities and the height of a solid portion from the substrate surface.
Figure 13B:
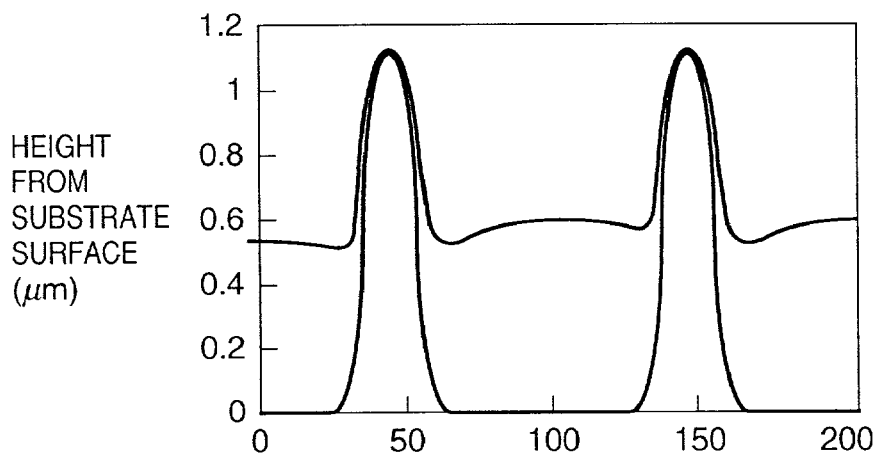
Figure 13C:
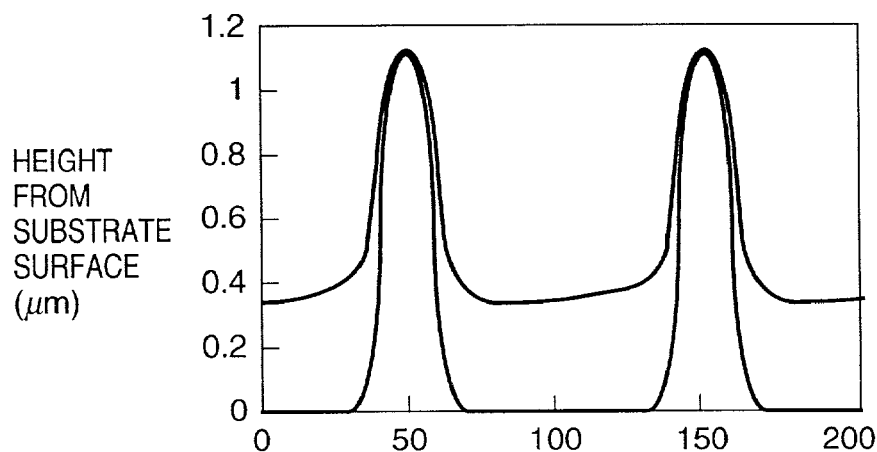
Figure 14A:
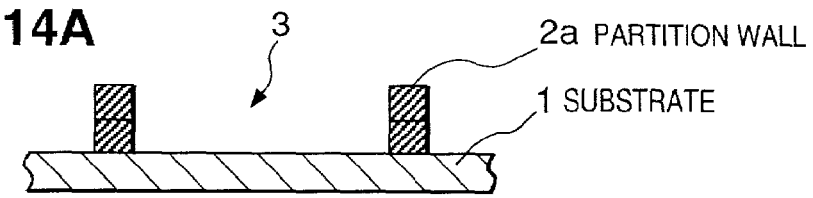
FIGS. 14A to 14E are sectional views showing how partition walls are formed by a plurality of layers.
Figure 14B:
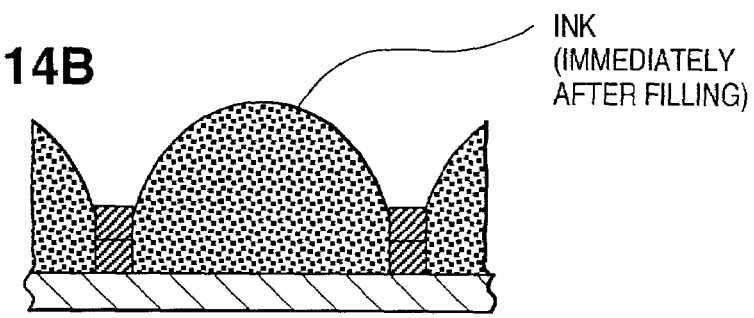
Figure 14C:
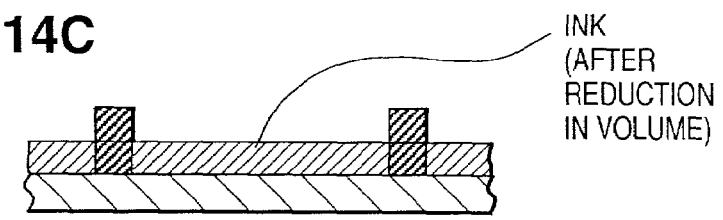
Figure 14D:
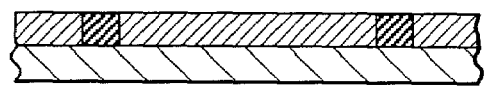
Figure 14E:
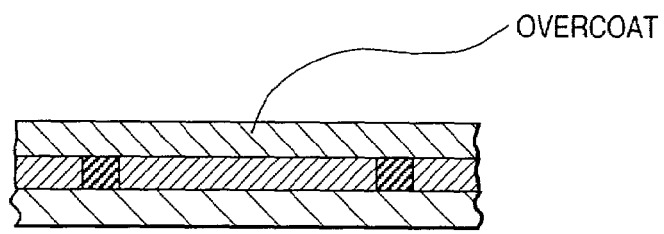

FIGS. 12A to 12E are sectional views showing the respective steps in the second embodiment of the present invention. The steps in FIGS. 12A to 12C are the same as those in the first embodiment. This embodiment differs from the first embodiment in the step show in FIG. 12E.

In the first embodiment, the function of planarizing the stepped portions between the partition wall member 2a and the colored layer surface (ink surface) in the respective pixels is implemented by one step. In contrast to this, in the second embodiment, the respective recess portions partitioned with the partition walls are independently filled with a filler. This makes it possible to more planarize the surface of the final color filter.

Although the same material may be used for the filler and overcoat, different materials are preferably used in accordance with the difference in their functions. An ink-jet system is suitably used to apply the filler because the amount of filler can be easily adjusted. As a filler to be used in this case, a filler having the same components as those of ink used to form a colored layer can be suitably used because handling and maintenance of the ink-jet head are facilitated, and affinity with the colored layer improves.

In addition, the step of curing a filler may be set between the step of planarizing the stepped portions between the partition wall member 2a and the color layer surface and the step of making the levels of the respective pixels uniform (the step of forming an overcoat).

Third Embodiment

FIGS. 14A to 14E are sectional views showing the respective steps in the third embodiment of the present invention. This embodiment is the same as the first embodiment except that a partition wall member has a two-layer structure and the upper layer is removed after the volume reducing step.

In a case wherein the thickness of each partition wall changes during a manufacturing process as in this embodiment, the distance from the bottom portion to the top portion of the partition wall is the distance from the bottom portion to the top portion when the recess portion is filled with ink.

Various changes and modifications of the above embodiments can be made without departing the scope and spirit of the invention.

For example, a panel having a color filter on the TFT array side has recently become available. The color filter defined in this specification is a member colored by coloring materials and includes both a color filter placed on the TFT array side and a color filter placed on the other side.

The present invention is not limited to the above embodiments and various changes and modifications can be made within the spirit and scope of the invention.

The present invention can be applied to, for example, an EL (electroluminescence) display element manufacturing method and apparatus. An EL display element has a structure in which a thin film containing inorganic and organic fluorescent compounds is sandwiched between a cathode and an anode. In this element, electrons and holes are injected into the thin film to recombine and generate excitons, and light is emitted by using fluorescence or phosphorescence that occurs when the excitons are deactivated. Of the fluorescent materials used for such EL display elements, materials that emit red, green, and blue light are used in the manufacturing apparatus of the present invention to form a pattern on an element substrate such as a TFT substrate by the ink-jet method, thereby manufacturing a spontaneous emission type full-color EL display element. The present invention incorporates such an EL display element and an EL display element manufacturing method and apparatus.

The manufacturing apparatus of the present invention may include a means for executing surface treatments such as a plasma process, UV process, and coupling process for a resin resist, pixel electrodes, and the surface of a lower layer to help adhesion of an EL material.

The EL display element manufactured by the manufacturing method of the present invention can be applied to the field of low information, such as segment display and still image display based on full-frame emission, and can also be used as a light source having a point/line/plane shape. In addition, a full-color display element with high luminance and excellent responsibility can be obtained by using passive display elements and active elements such as TFTs.

Figure 20:
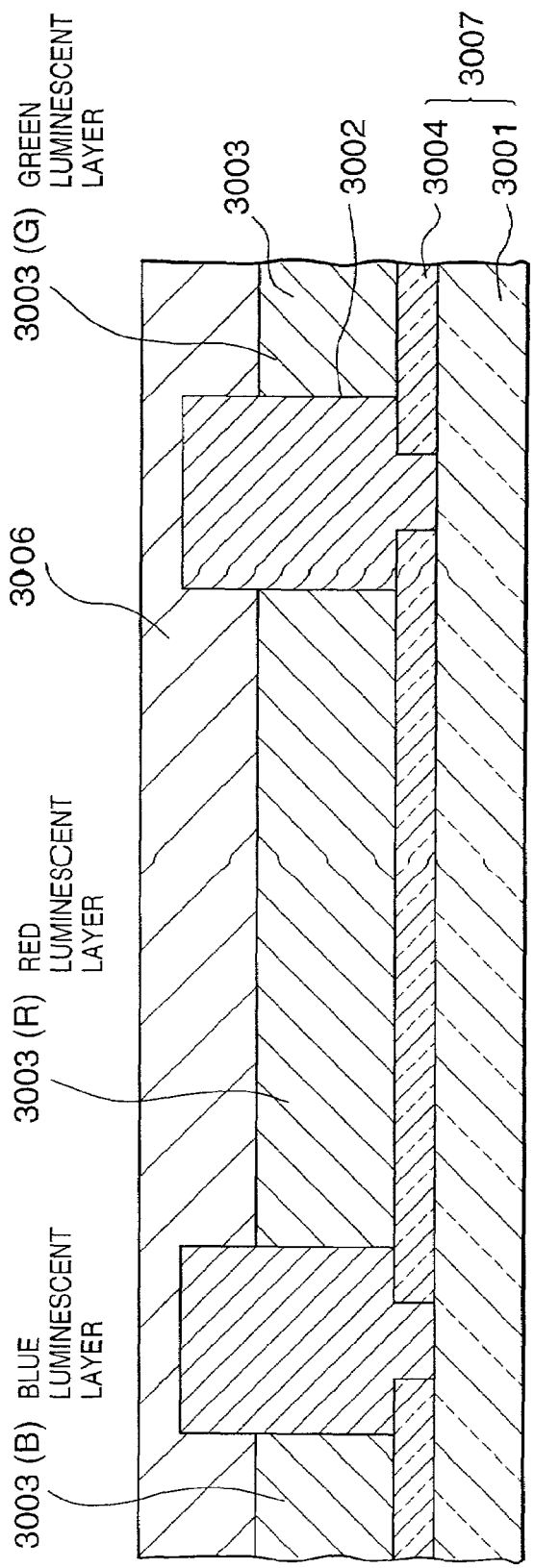
FIG. 20 is a sectional view showing an example of the structure of an EL element.
Figure 21A:
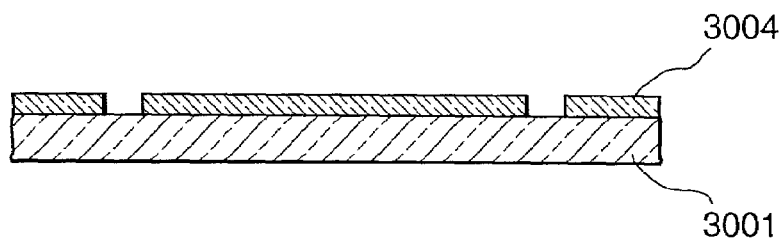
FIGS. 21A to 21D are sectional views showing en example of a manufacturing process for an EL element.
Figure 21B:
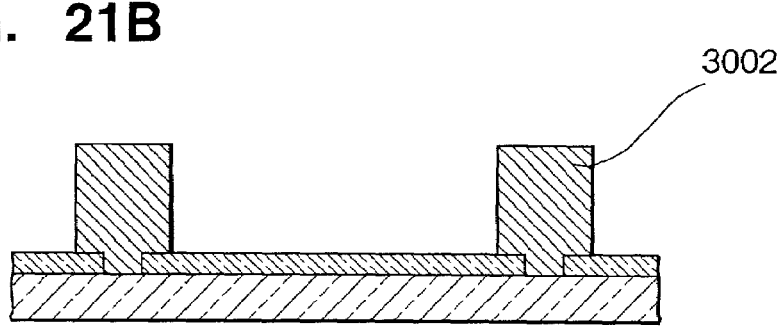
Figure 21C:
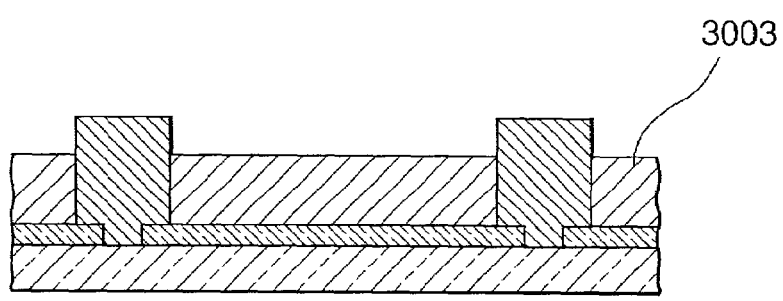
Figure 21D:
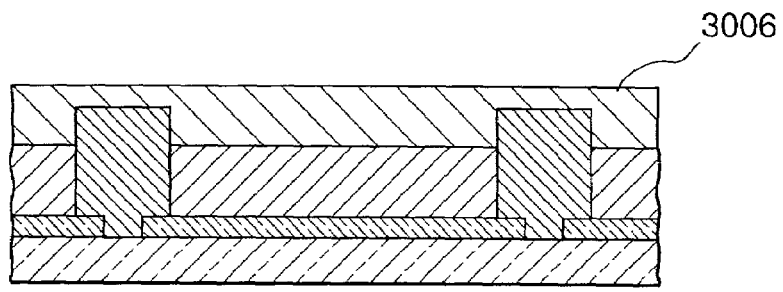
Figure 15:
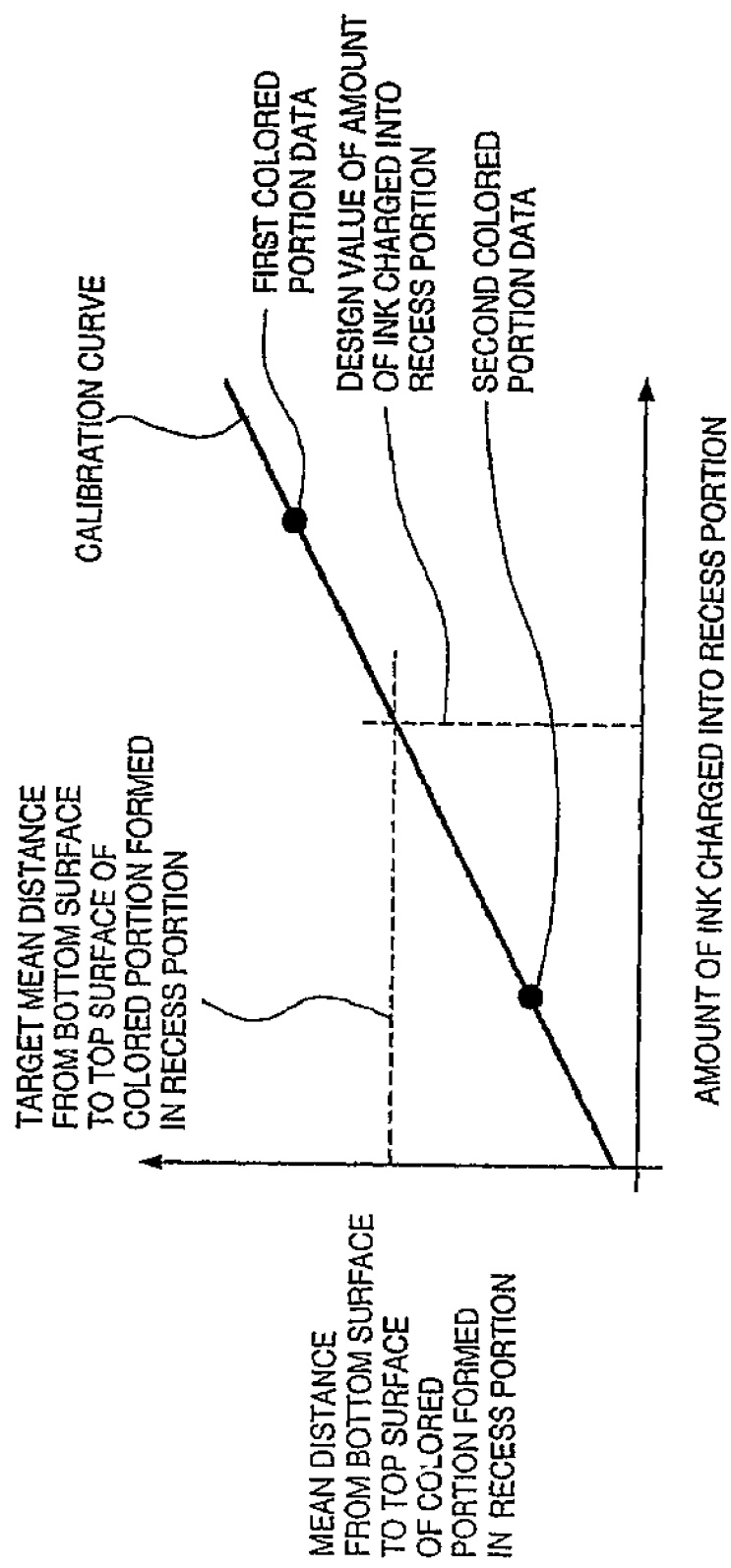

An example of the organic EL element manufactured by the present invention will be described below. FIG. 20 is a sectional view showing the multilayer structure of the organic EL element. The organic EL element shown in FIG. 20 is comprised of a transparent substrate 3001, partition wall (partitioning member) 3002, luminescent layer 3003, transparent electrodes 3004, and metal layer 3006. Reference numeral 3007 denotes a portion constituted by the transparent substrate 3001 and transparent electrode 3004. This portion will be referred to as a driving substrate.

The transparent substrate 3001 is not limited to any specific substrate as long as it has the required characteristics of an EL display element, e.g., transparency and mechanical strength. For example, a light-transmitting substrate such as a glass substrate or plastic substrate can be used.

The partition wall 3002 has the function of isolating pixels from each other to prevent mixing of a material for the luminescent layer 3003 between adjacent pixels when the material is supplied from a liquid supply head. That is, the partition wall 3002 serves as a color mixing prevention wall. When this partition wall 3002 is formed on the transparent substrate 3001, at least one recesse (pixel areas) is formed on the substrate. Note that no problem arises if a member having a multilayer structure exhibiting affinity different from that of the material is used as the partition wall 3002.

The luminescent layer 3003 is formed by stacking a material that emits light when a current flows therein, e.g., a known organic semiconductor material such as polyphenylene vinylene (PPV), to a thickness enough to obtain a sufficient light amount, e.g., 0.05 $\mu$m to 0.2 $\mu$m m. The luminescent layer 3003 is formed by filling recesses surrounded by the partition wall 3002 with a thin-film material liquid (spontaneous emission material) by the ink-jet method or the like and heating the resultant structure.

The transparent electrodes 3004 are made of a material having conductivity and transparency, e.g., ITO. The transparent electrodes 3004 are independently formed in the respective pixel areas to emit light in units of pixels.

The metal layer 3006 is formed by stacking a conductive metal material, e.g., aluminum lithium (Al—Li), to a thickness of about 0.1 $\mu$m to 1.0 $\mu$m. The metal layer 3006 is formed to serve as a common electrode opposing the transparent electrodes 3004.

The driving substrate 3007 is formed by stacking a plurality of layers, e.g., a thin-film transistor (TFT), wiring film, and insulating film (neither is shown), and designed to allow voltages to be applied between the metal layer 3006 and the transparent electrodes 3004 in units of pixels. The driving substrate 3007 is manufactured by a known thin-film process.

According to the organic EL element having the above layer structure, in the pixel area between the transparent electrode 3004 and the metal layer 3006 between which a voltage is applied, a current flows in the luminescent layer 3003 to cause electroluminescence. As a consequence, light emerges through the transparent electrode 3004 and transparent substrate 3001.

A process of manufacturing an organic EL element will be described below.

FIGS. 21A to 21D are sectional views showing an example of a process of manufacturing an organic EL element. Steps (a) to (d) will be described below with reference to FIGS. 21A to 21D.

Step (a)

First of all, a glass substrate is used as the transparent substrate 3001, and a plurality of layers, e.g., a thin-film transistor (TFT), wiring film, and insulating film (neither is shown), are stacked on each other. The transparent electrodes 3004 are then formed on the resultant structure to allow a voltage to be applied to each pixel area.

Step (b)

The partition walls 3002 are formed between the respective pixels. Each partition wall 3002 serves as a mixing prevention wall for preventing mixing of an EL material solution, which is formed into a luminescent layer, between adjacent pixels when the EL material solution is applied by the ink-jet method. In this case, each partition wall is formed by a photolithography method using a resist containing a black material. However, the present invention is not limited to this, and various materials, colors, forming methods, and the like can be used.

Step (c)

Each recess portion surrounded by the partition walls 3002 is filled with the EL material by the ink-jet system. The resultant structure is then heated to form the luminescent layer 3003.

Step (d)

The metal layer 3006 is further formed on the luminescent layer 3003.

A full-color EL element can be formed by a simple process through steps (a) to (d) described above. In forming a color organic EL element, in particular, an ink-jet system capable of discharging a desired EL material to arbitrary positions can be effectively used because luminescent layers that emit light of different colors, e.g., red, green, and blue, must be formed.

In the present invention, solid portions are formed by filling recess portions surrounded by partition walls with a liquid material. The colored portions of a color filter correspond to the above solid portions, whereas the luminescent portions of an EL element correspond to the solid portions. The solid portions including the above colored portions or luminescent portions are portions used to display information and also portions for visual recognition of colors (display portion).

The colored portions of a color filter and the luminescent portions of an EL element are portions for producing colors (generating colors), and hence can be called color producing portions. In the case of a color filter, for example, light from a backlight passes through the colored portions to produce R, G, and B light. In the case of an EL element, R, G, and B light is reproduced when the luminescent portions spontaneously emit light.

The above ink and spontaneous emission materials are materials for forming the luminescent portions, and hence can be called materials for producing colors. In addition, the above ink and spontaneous emission materials are liquids, and hence can be generically called a liquid material. Furthermore, the above ink and spontaneous emission materials are materials that are used to form display portions used for display. Note that this liquid material contains evaporative first components and second components which become solid portions after evaporation of the first components.

As described above, the present invention can be applied to the manufacture of a panel having at least one solid portion (display portion) formed by filling at least one recess portion surrounded by partition walls with a material, e.g., the manufacture of a panel (display element) used for a color display device, including a color filter, EL element, and the like. Note that this panel for a display device is not limited to the above color filter and EL display element, and includes panels in general, which are formed by filling recessed in a substrate with a liquid material and can be used for display devices.

The present invention described above has exemplified a printer, which comprises means (e.g., an electrothermal transducer, laser beam generator, and the like) for generating heat energy as energy utilized upon execution of ink discharge, and causes a change in state of ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printing head, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printing head, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printing head having a length corresponding to the width of a maximum printing medium which can be printed by the printer, either the arrangement which satisfies the full-line length by combining a plurality of printing heads as disclosed in the above specification or the arrangement as a signal printing head obtained by forming printing heads integrally can be used.

In addition, not only an exchangeable chip type printing head, as described in the above embodiments which can be electrically connected to the apparatus main unit and can receive ink from the apparatus main unit upon being mounted on the apparatus main unit but also a cartridge type printing head in which an ink tank is integrally arranged on the printing head itself can be applicable to the present invention.

It is preferable to add recovery means for the printing head, preliminary auxiliary means, and the like provided as an arrangement of the printer of the present invention since the printing operation can be further stabilized. Examples of such means include, for printing head, capping means cleaning means, pressurization or suction means, and preliminary heating means using electrothermal transducers, another heating element, or a combination thereof. It is also effective for stable printing to provide a preliminary discharge mode which performs discharge independently of printing.

Although a fluid ink is employed in the above embodiments of the present invention, ink which solidifies at the room temperature or lower, or ink which softens or liquifies at the room temperature may be used. That is, any ink which liquifies when a recording signal is supplied may be used.

In addition, in order to prevent a temperature rise caused by hat energy by positively utilizing it as energy for causing a change in state of the ink from a solid state to a liquid state, or to prevent evaporation of the ink, ink which is solid in a non-use state and liquefies upon heating may be used. In any case, ink which liquefies upon application of heat energy according to a printing signal and is discharged in a liquid state, ink which begins to solidify when it reaches a printing medium, or the like, is applicable to the present invention. In this case, ink may be situated opposite electrothermal transducers which being heated in a liquid or solid state in recess portions of a porous sheet or through holes, as described in Japanese Paten Laid-Open No. 54-56847 or 60-71260. In the present invention, the above-mentioned film boiling system is most effective for the above-mentioned inks.

As has been described above, according to the present invention, display device elements including color filters, EL elements, and the like whose surfaces are planarized.

The present invention is not limited to the above embodiments and various changes and modifications can be made within the spirit and scope of the present invention. Therefore, to apprise the public of the scope of the present invention the following claims are made.

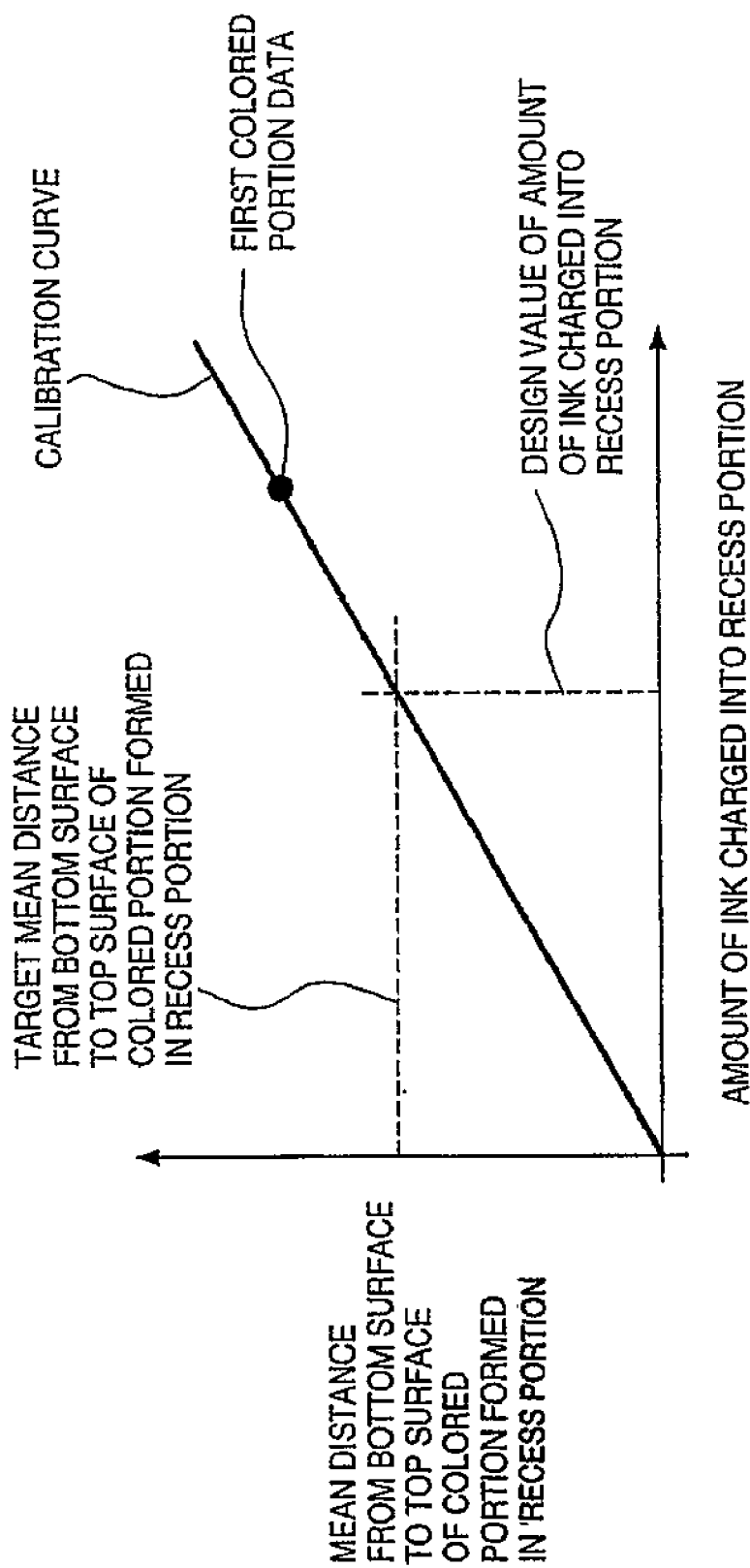

What is claimed is:

1. A display panel comprising:
   a color filter having a color portion formed in at least one recess portion surrounded by partition walls on a substrate and protective layers formed on said color portion and said partition walls, wherein a thickness of said color portion is 20% to 80% of a thickness of said partition walls, and a thickness of a protective layer formed on said partition walls is smaller than a thickness of a protective layer formed on said color portion;
   a counter substrate which faces said color filter; and
   a liquid crystal layer disposed between said color filter and said counter substrate,
   wherein the protective layers are formed of a heat-melted material.

2. A display panel according to claim 1, further comprising a spacer is arranged on said protective layer formed on said partition walls and on said protective layer formed on said color portion.

3. A display panel according to claim 1, wherein the thickness of said color portion is 40% to 60% of the thickness of said partition walls.

4. A display panel according to claim 1, wherein the thickness of said color portion is about 50% of the thickness of said partition walls.

5. A display panel according to claim 1, wherein an average value of the thickness of said partition wall is larger than 1 $\mu$m.

6. A display panel according to claim 1, wherein an average value of the thickness of said partition wall is 2 $\mu$m to 3 $\mu$m.

7. A display panel according to claim 1, wherein an average value of the thickness of said color portion is larger than 0.6 $\mu$m.

8. A display panel according to claim 1, wherein the thickness of said protective layer formed on said partition walls is equal to or greater than 0.1 $\mu$m and less than 0.5 $\mu$m, and the thickness of said protective layer formed on said color portion is equal to or more than 0.5 $\mu$m and less than 3 $\mu$m.

9. A display panel according to claim 1, wherein said partition walls are black matrixes that shade light.

10. A display panel, comprising:
    a display portion formed in at least one recess portion surrounded by partition walls on a substrate, said display portion having a thickness smaller than a thickness of said partition walls; and
    protective layers formed on said display portion and said partition walls,
    wherein a thickness of a protective layer formed on said partition walls is smaller than a thickness of a protective layer formed on said display portion, and wherein the protective layers are formed of a heat-melted material.

11. A display panel according to claim 10, wherein said display panel is an electroluminescence element and said display portion is a light-emitting portion.

12. A display panel according to claim 10, wherein said display panel includes a color filter and said display portion is a color portion.

13. A method of manufacturing a display panel comprising the steps of:
    providing a color filter which has a color portion formed in at least one recess portion surrounded by partition walls on a substrate and protective layers formed on the color portion and the partition walls, wherein a thickness of the color portion is 20% to 80% of a thickness of the partition walls, and a thickness of a protective layer formed on the partition walls is smaller than a thickness of a protective layer formed on the color portion;
    providing a counter substrate which faces the color filter; and
    disposing a liquid crystal layer between the color filter and the counter substrate,
    wherein the protective layers are formed of a heat-melted material.

14. A method according to claim 13, further comprising the step of arranging the spacer on the protective layer formed on the partition walls and also on the protective layer formed on the color portion.

15. A method according to claim 13, further comprising the step of determining an amount of an ink to be injected into one recess portion for forming the color portion, said determining step comprising:
(A) a first step of measuring at least a first average thickness of the color portion formed by injecting a first amount of ink to a first recess portion and a second average thickness of the color portion formed by injecting a second amount of ink to a second recess portion;
(B) a second step of generating data representing a relationship between an average thickness of the color portion and ink amount based on at least first and second average thicknesses and corresponding ink amounts; and
(C) a third step of determining an ink amount to be injected into the one recess portion based on the data so that the average thickness of the color portion becomes 20% to 80% of the thickness of the partition walls.

16. A method according to claim 13, further comprising the step of determining an amount of ink to be injected into one recess portion for forming the color portion, said determining step comprising:
(A) a first step of measuring an average thickness of the color portion formed by injecting a predetermined amount of ink into a first recess portion;
(B) a second step of generating data representing a relationship between an average thickness of the color portion and ink amount based on the average thickness and corresponding ink amount; and
(C) a third step of determining an ink amount to be injected into the one recess portion based on the data so that the average thickness of the color portion becomes 20% to 80% of the thickness of the partition walls.

17. A method according to claim 13, further comprising the step of inspecting whether or not the average thickness of the color portion is 20% to 80% of the thickness of the partition walls.

18. A method according to claim 17, wherein said inspecting step is performed every time a predetermined number of color filters are manufactured.

19. A method according to claim 17, wherein the average thickness of at least one color portion is inspected in said inspecting step.

20. A method according to claim 17, further comprising the step of adjusting the ink amount so that the average thickness of the color portion becomes 20% to 80% of the thickness of the partition walls in the case that the average thickness of the color portion is judged as not to be 20% to 80% of the thickness of the partition walls in said inspecting step.

21. A method according to claim 13, wherein the color portion is formed by injecting ink into the recess portion, and the injecting operation is performed by an ink-jet head.

22. A method of manufacturing a color filter comprising the steps of:
forming a color portion by injecting ink into at least one recess portion surrounded by partition walls on a substrate so that a thickness of the color portion becomes 20% to 80% of a thickness of the partition walls; and
forming protective layers on the color portion and the partition walls so that a thickness of a first protective layer formed on the partition walls becomes smaller than a thickness of a second protective layer formed on the color portion,
wherein the protective layers are formed of a heat-melted material.

23. A color filter having colored portions formed by filling at least one recess portion surrounded by partition walls on a substrate with ink, comprising:
a colored portion formed in the recess portion, with a mean distance from a bottom surface to a top surface of said colored portion being 20% to 80% of a distance from a bottom portion to a top portion of the partition wall; and
a protective portion formed on the top surface of said colored portion and the top portion of the partition wall,
wherein a distance from a bottom surface to a top surface of said protective portion formed on the top portion of the partition wall is smaller than a distance from a bottom surface to a top surface of said protective portion formed on the top surface of said colored portion, and
said protective portion is formed of a heat-melted material.

* * * * *

UNITED STATES PATENT AND TRADEMARK OFFICE
CERTIFICATE OF CORRECTION

PATENT NO. : 7,014,521 B1
APPLICATION NO. : 09/631951
DATED : March 21, 2006
INVENTOR(S) : Hiroshi Fujiike et al.

It is certified that error appears in the above-identified patent and that said Letters Patent is hereby corrected as shown below:

SHEET 15: (as shown in attached)

FIG. 15, "PROCESS" should read --RECESS--.

SHEET 16: (as shown in attached)

FIG. 16, "PROCESS" should read --RECESS--.

COLUMN 18:

Line 24, "Red" should read --Green--.
    Line 43, "Red" should read --Green--.

COLUMN 26:

Line 47, "0.2 μm m." should read --0.2 μm.--.

COLUMN 28:

Line 18, "recessed in" should read --recessed portions in--.

COLUMN 29:

Line 35, "hat" should read --heat--.
    Line 43, "which" should read --while--.

UNITED STATES PATENT AND TRADEMARK OFFICE
CERTIFICATE OF CORRECTION

PATENT NO. : 7,014,521 B1
APPLICATION NO. : 09/631951
DATED : March 21, 2006
INVENTOR(S) : Hiroshi Fujiike et al.

It is certified that error appears in the above-identified patent and that said Letters Patent is hereby corrected as shown below:

COLUMN 30:

Line 6, "is" should be deleted.

Signed and Sealed this

Nineteenth Day of December, 2006

JON W. DUDAS
*Director of the United States Patent and Trademark Office*